(12) United States Patent
Annapareddy et al.

(10) Patent No.: US 11,474,952 B2
(45) Date of Patent: Oct. 18, 2022

(54) METHODS, SYSTEMS, AND COMPUTER READABLE MEDIA FOR PERFORMING PAGE FAULT HANDLING

(71) Applicant: The Texas A&M University System, College Station, TX (US)

(72) Inventors: Narasimha Reddy Annapareddy, College Station, TX (US); Chih-Chieh Chou, San Jose, CA (US); Chandrahas Tirumulasetty, Bryan, TX (US); Paul Gratz, College Station, TX (US); Ayman Abouelwafa, Folsom, CA (US)

(73) Assignees: The Texas A&M University System, College Station, TX (US); Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/335,936

(22) Filed: Jun. 1, 2021

(65) Prior Publication Data
US 2021/0374071 A1    Dec. 2, 2021

Related U.S. Application Data

(60) Provisional application No. 63/033,015, filed on Jun. 1, 2020.

(51) Int. Cl.
*G06F 12/1027* (2016.01)
*G06F 12/02* (2006.01)

(52) U.S. Cl.
CPC ...... *G06F 12/1027* (2013.01); *G06F 12/0223* (2013.01); *G06F 2212/657* (2013.01); *G06F 2212/684* (2013.01)

(58) Field of Classification Search
None
See application file for complete search history.

(56) References Cited

U.S. PATENT DOCUMENTS

2019/0163641 A1\* 5/2019 Cooray ............... G06F 12/1027

OTHER PUBLICATIONS

"Direct access for files." https://www.kernel.org/doc/Documentation/filesystems/dax.txt., accessed. Jul. 21, 2021.
(Continued)

*Primary Examiner* — Charles J Choi
(74) *Attorney, Agent, or Firm* — Jenkins, Wilson, Taylor & Hunt, P.A.

(57) ABSTRACT

Methods, systems, and computer readable media for performing page fault handling are disclosed. According to one method, the method includes: after a translation lookaside buffer (TLB) miss associated with a virtual memory page occurs, identifying, in a page table, a page table entry (PTE) associated with the virtual memory page; determining, using a first indicator in the PTE, that the virtual memory page is not present in a main memory; determining, using a second indicator in the PTE, that the virtual memory page is associated with a valid memory address and that the virtual memory page is capable of using pre-allocated pages; obtaining, from a pre-allocation table, a page frame number associated with a pre-allocated page; and updating the PTE to indicate the page frame number.

20 Claims, 9 Drawing Sheets

(56) References Cited

OTHER PUBLICATIONS

"Docker container bind mounts." https://docs.docker.com/storage/bind-mounts//., accessed. Jul. 21, 2021.
"Gen-Z specifications." https://genzconsortium.org/specifications/, Gen-Z Core Specification 1.1e, accessed Jun. 8, 2022.
"Gen-Z specifications." https://genzconsortium.org/specifications/, Gen-Z Physical Layer Specification 1.1, accessed Jun. 8, 2022.
"Gen-Z specifications." https://genzconsortium.org/specifications/, Gen-Z SFF 8639 2.5-Inch Specification 1.0, accessed Jun. 8, 2022.
"Gen-Z specifications." https://genzconsortium.org/specifications/, Gen-Z SFF 8639 2.5-Inch Compact Specification 1.0, accessed Jun. 8, 2022.
"Gen-Z specifications." https://genzconsortium.org/specifications/, Gen-Z SFF 8201 2.5-Inch with Gen-Z Scalable Connector Specification, accessed Jun. 8, 2022.
"Gen-Z specifications." https://genzconsortium.org/specifications/, Gen-Z Fabric Management Specification 1.0, accessed Jun. 8, 2022.
"Intel optane technology." https://www.intel.com/content, accessed Jun. 8, 2022.
"Intel persistent memory development kit." https://pmem.io/pmdk/., accessed Jul. 21, 2021.
"Linux pipe." http://man7.org/linux/man-pages/man2/pipe.2.html., accessed Jul. 21, 2021.
"Linux userfaultfd." http://man7.org/linux/manpages/man2/userfaultfd.2.html, accessed Jun. 8, 2022.
"Linux write." http://man7.org/linux/man-pages/man2/write.2.html., accessed Jul. 21, 2021.
"Lockless ring buffer design." https://www.kernel.org/doc/Documentation/trace/ring-buffer-design.txt. Accessed Jul. 21, 2021.
"Mmapv1 storage engine." https://docs.mongodb.com/manual/processor core/mmapv1/, accessed Jun. 8, 2022.
"Phase change memory." http://www.pdl.cmu.edu/SDI/2009/slides/Numonyx.pdf.
"Transaction isolation levels." https://docs.microsoft.com/en-US/sql/odbc/reference/develop-app/transaction-isolation-levels?view=sql-server-2017.
Alam et al., "Do-it-yourself virtual memory translation," in ISCA '17, (Toronto, ON, Canada), ACM, Jun. 2017.
Baliley et al., "The NAS parallel benchmarks-summary and preliminary results," in SC '91, pp. 158-165, ACM, 1991.
Bari et al., "CQNCR: Optimal VM migration planning in cloud data centers," in IFIP '14, (Trondheim, Norway), IEEE, Jun. 2014.
Bhargava et al., "Accelerating two-dimensional page walks for virtualized systems," in International conference on Architectural support for programming languages and operating systems '13, 2008.
Bienia et al., "The PARSEC benchmark suite: characterization and architectural implications," in PACT '08, (Toronto, Ontario, Canada), pp. 72-81, ACM, Oct. 2008.
Binkert et al., "The gem5 simulator," ACM SIGARCH Computer Architecture News, vol. 39, pp. 1-7, May 2011.
Borkar, "Designing reliable systems from unreliable components: The challenges of transistor variability and degradation," IEEE Micro, vol. 25, pp. 10-16 (2005).
Chanchio et al., "Communication state transfer for the mobility of concurrent heterogeneous computing," IEEE Transactions on Computers, vol. 53, pp. 1260-1273 (2004).
Chen, "A review of emerging non-volatile memory (NVM) technologies and applications," Solid-State Electronics, vol. 125, pp. 25-38 (2016).
Cho et al., "Natjam: Design and evaluation of eviction policies for supporting priorities and deadlines in mapreduce clusters," in SoCC '13, (Santa Clara, CA), ACM, Oct. 2013.
Chou et al., "vnvml: An efficient user space library for virtualizing and sharing non-volatile memories," in MSST '19 Proceedings of the 35st Symposium on Mass Storage Systems and Technologies, (Santa Clara, CA), IEEE, 2019.
Chou, "Optimizing Emerging Memory Systems for Performance," 2020.
Clark et al., "Live migration of virtual machines," in NSDI '05, (Berkeley, CA), pp. 273-286, USENIX, May 2005.
Coburn et al., "NV-Heaps: Making persistent objects fast and safe with next generation, non-volatile memories," in ASPLOS XVI Proceedings of the sixteenth international conference on Architectural support for programming languages and operating systems, (Newport Beach, California, USA), pp. 105-118, ACM, 2011.
Condit et al., "Better i/o through byte-addressable, persistent memory," in SOSP '09 Proceedings of the ACM SIGOPS 22nd symposium on Operating systems principles, (Big Sky, Montana, USA), ACM, 2009.
Cooper et al., "Benchmarking cloud serving systems with YCSB," in SoCC '10 Proceedings of the 1st ACM symposium on Cloud computing, (Indianapolis, Indiana, USA), pp. 143-154, ACM, 2010.
Dong et al., "Hybrid checkpointing using emerging nonvolatile memories for future exascale systems," ACM TACO, vol. 8, Jul. 2011.
Dong et al., "Leveraging 3d pcram technologies to reduce checkpoint overhead for future exascale systems," in SC '09, (Portland, Oregon), ACM, Nov. 2009.
Doshi et al., "Atomic persistence for scm with a non-intrusive backend controller," in HPCA '16 Proceedings of the IEEE International Symposium on High Performance Computer Architecture, (Barcelona, Spain), IEEE, 2016.
Dulloor et al., "System software for persistent memory," in EuroSys '14 Proceedings of the Ninth European Conference on Computer Systems, (Amsterdam, The Netherlands), ACM, 2014.
Eisner et al., "Quill: Exploiting fast non-volatile memory by transparently bypassing the file system," UCSD CSE Tech. Rep. CS2013-0991, University of California, San Diego, San Diego, CA, 2013.
Fedorov et al., "Speculative paging for future NVM storage," in MEMSYS '17 Proceedings of the International Symposium on Memory Systems, (Alexandria, Virginia), 2017.
Fernando et al., "Phoenix: Memory speed hpc i/o with nvm," in HiPC '16, (Hyderabad, India), IEEE, Dec. 2016.
Gao et al., "Real-time in-memory checkpointing for future hybrid memory systems," in ICS '15, (Newport Beach, CA), pp. 263-272, ACM, Jun. 2015.
Giles et al., "SoftWraP: A lightweight framework for transactional support of storage class memory," in MSST '15 Proceedings of the 31st Symposium on Mass Storage Systems and Technologies, (Santa Clara, CA, USA), pp. 1-14, IEEE, 2015.
Jo et al., "Efficient live migration of virtual machines using shared storage," in VEE '13, (Houston, TX), pp. 41-50, ACM, Mar. 2013.
Hines et al., "Post-copy live migration of virtual machines," ACM SIGOPS Operating Systems Review, vol. 43, pp. 14-26 (2009).
Joshi et al., "ATOM: Atomic durability in non-volatile memory through hardware logging," in HPCA '17 Proceedings of the IEEE International Symposium on High Performance Computer Architecture, (Austin, TX, USA), IEEE, 2017.
Jung et al., "FRASH: Exploiting storage class memory in hybrid file system for hierarchical storage," ACM Transactions on Storage (TOS), vol. 6(1) (2010).
Kannan et al., "Optimizing checkpoints using nvm as virtual memory," in IPDPS '13, (Boston, MA), IEEE, May 2013.
Kashyap et al., "Instant os updates via userspace checkpoint-and-restart," in ATC '16, (Denver, CO), pp. 605-619, USENIX, Jun. 2016.
Keeton, "Memory-driven computing," in FAST '17, (Santa Clara, CA), USENIX Association, 2017.
Krounbi et al., "Status and challenges for non-volatile spin-transfer torque ram (stt-ram)," in International Symposium on Advanced Gate Stack Technology '10, (Albany, NY), Sep. 2010.
Kwon et al., "Strata: A cross media file system," in SOSP '17 Proceedings of the 26th Symposium on Operating Systems Principles, (Shanghai, China), pp. 460-477, ACM, 2017.
Lee et al., "Phase-change technology and the future of main memory," IEEE Micro, vol. 30, pp. 131-141 (2010).
Li et al., "Improving preemptive scheduling with application-transparent checkpointing in shared clusters," in Middleware '15, (Vancouver, BC, Canada), pp. 222-234, ACM, Dec. 2015.

(56) References Cited

OTHER PUBLICATIONS

Liang et al., "A case for virtualizing persistent memory," in SoCC '16 Proceedings of the Seventh ACM Symposium on Cloud Computing, (Santa Clara, CA, USA), ACM, 2016.

Memaripour et al., "Atomic in-place updates for non-volatile main memories with kamino-tx," in EuroSys '17 Proceedings of the Twelfth European Conference on Computer Systems, (Belgrade, Serbia), pp. 499-512, ACM, 2017.

Narayanan et al., "Whole-system persistence," in ASPLOS XVII Proceedings of the seventeenth international conference on Architectural Support for Programming Languages and Operating Systems, (London, England, UK), ACM, 2012.

Peglar, "The future of storage systems—a dangerous opportunity," in MSST '19 Proceedings of the 35st Symposium on Mass Storage Systems and Technologies, (Santa Clara, CA), IEEE, 2019.

Pelley et al., "Memory persistency," in ISCA '14 Proceeding of the 41st annual international symposium on Computer architecture, (Minneapolis, Minnesota, USA), pp. 265-276, ACM, 2014.

Qiu et al., "NVMFS: A hybrid file system for improving random write in NAND-flash SSD," in MSST '13 IEEE 29th Symposium on Mass Storage Systems and Technologies, (Long Beach, CA, USA), IEEE, 2013.

Qureshi et al., "Scalable high performance main memory system using phase-change memory technology," in ISCA '09 Proceedings of the 36th annual international symposium on Computer architecture, (Austin, TX, USA), ACM, 2009.

Sahni et al., "A hybrid approach to live migration of virtual machines," in CCEM '12, (Bangalore, India), IEEE, Oct. 2012.

Schroeder et al., "Dram errors in the wild: A large-scale field study," in SIGMETRICS '09, (Seattle, WA), pp. 193-204, ACM, Jun. 2009.

Shao et al., "Chord: Checkpoint-based scheduling using hybrid waiting list in shared clusters," Journal of Systems and Software, vol. 131, pp. 22-34, Sep. 2017.

Swanson, "A vision of persistence." https://www.sigarch.org/a-vision-of-persistence/ (2017).

Venkataraman et al., "Consistent and durable data structures for non-volatile byte-addressable memory," in FAST '11 Proceedings of the 9th USENIX Conference on File and Storage Technologies, USENIX, 2011.

Volos et al., "Aerie: Flexible file-system interfaces to storage-class memory," in EuroSys '14 Proceedings of the Ninth European Conference on Computer Systems, (Amsterdam, The Netherlands), ACM, 2014.

Volos et al., "Mnemosyne: Lightweight persistent memory," in ASPLOS XVI Proceedings of the sixteenth international conference on Architectural support for programming languages and operating systems, (Newport Beach, California, USA), pp. 91-104, ACM, 2011.

Wang et al., "How to be consistent with persistent memory? an evaluation approach," in NAS '15, (Boston, MA), pp. 186-194, IEEE, Aug. 2015.

Woo et al., "The SPLASH-2 programs: Characterization and methodological considerations," in ISCA '95, (S. Margherita Ligure, Italy), pp. 24-36, ACM, Jun. 1995.

Wu et al., "SCMFS: A file system for storage class memory," in SC '11 Proceedings of 2011 International Conference for High Performance Computing, Networking, Storage and Analysis, (Seattle, Washington, USA), ACM, 2011.

Xie et al., "3d memory stacking for fast checkpointing/restore applications," in 3DIC '10, (Munich, Germany), IEEE, Nov. 2010.

Xu et al., "Nova: A log-structured file system for hybrid volatile/non-volatile main memories," in FAST '16 Proceedings of the 14th USENIX Conference on File and Storage Technologies, (Santa Clara, CA, USA), pp. 323-338, USENIX, 2016.

Yang et al., "NV-Tree: Reducing consistency cost for NVM-based single level systems," in FAST '15 Proceedings of the 13th USENIX Conference on File and Storage Technologies, (Santa Clara, CA, USA), USENIX, 2015.

Ye et al., "Live migration of multiple virtual machines with resource reservation in cloud computing environments," in CLOUD '11, (Washington, DC), IEEE, Jul. 2011.

Ye et al., "Virtual machine based energy-efficient data center architecture for cloud computing: A performance perspective," in GREENCOMCPSCOM '10, pp. 171-178, IEEE, Dec. 2010.

Zayas, "Attacking the process migration bottleneck," in SOSP '87, (Austin, TX), pp. 13-24, ACM, Nov. 1987.

Zhang et al., "A study of application performance with non-volatile main memory," in MSST '15 Proceedings of the 31st Symposium on Mass Storage Systems and Technologies, (Santa Clara, CA), IEEE, 2015.

Zhang et al., "Mojim: A reliable and highly-available non-volatile memory system," in ASPLOS '15 Proceedings of the Twentieth International Conference on Architectural Support for Programming Languages and Operating Systems, (Istanbul, Turkey), ACM, 2015.

Zhao et al., "Kiln: Closing the performance gap between systems with and without persistence support," in MICRO '13 Proceedings of the 46th Annual IEEE/ACM International Symposium on Microarchitecture, (Davis, CA, USA), IEEE, 2013.

Zhou et al., "A durable and energy efficient main memory using phase change memory technology," in ISCA '09 Proceedings of the 36th annual international symposium on Computer architecture, (Austin, TX, USA), ACM, 2009.

* cited by examiner

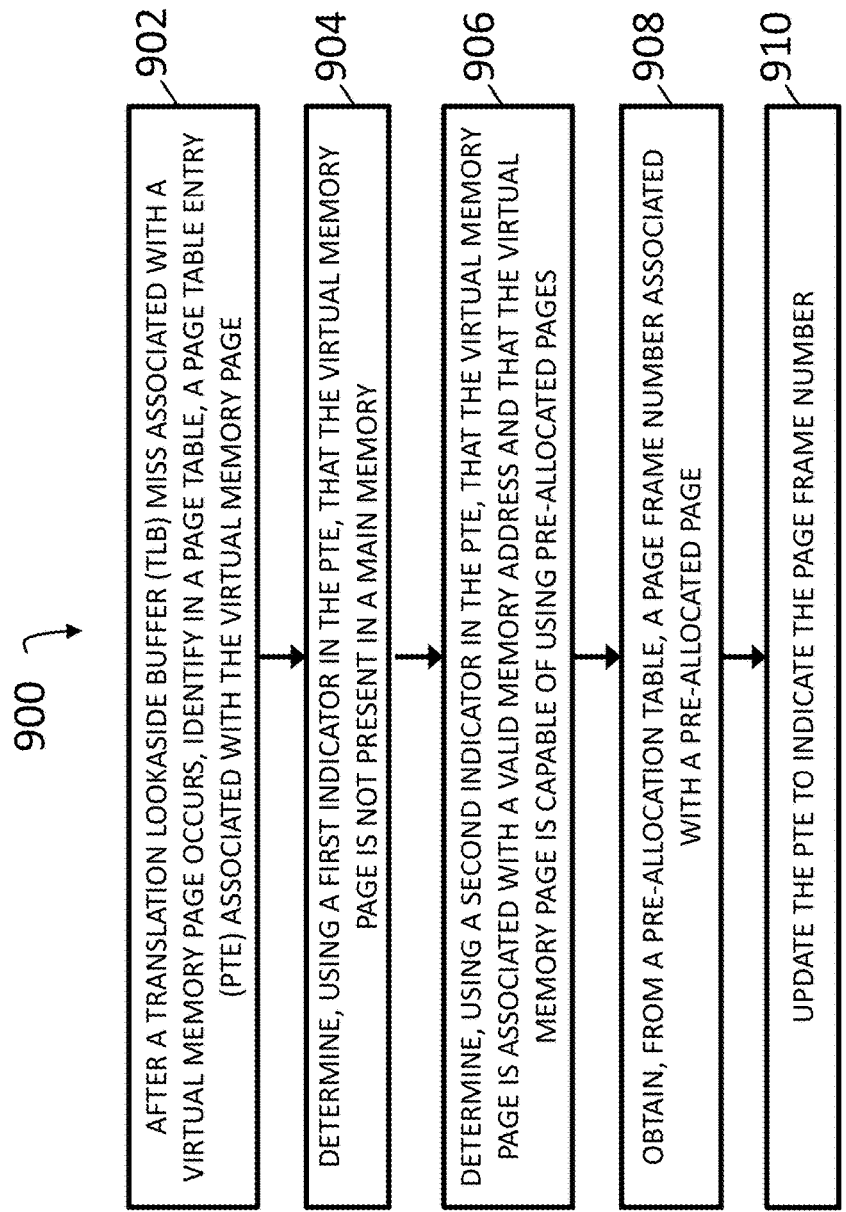

METHODS, SYSTEMS, AND COMPUTER READABLE MEDIA FOR PERFORMING PAGE FAULT HANDLING

PRIORITY CLAIM

This application claims the benefit of U.S. Provisional Patent Application Ser. No. 63/033,015 filed Jun. 1, 2020, the disclosure of which is incorporated herein by reference in its entirety.

GOVERNMENT INTEREST

This invention was made with government support under contract number I/UCRC-1439722 awarded by the National Science Foundation. The government has certain rights in the invention.

TECHNICAL FIELD

The subject matter described herein relates to virtual memory management. More specifically, the subject matter relates to methods, systems, and computer readable media for performing page fault handling.

BACKGROUND

Virtual memory is a memory management technique used in modern computer systems. Virtual memory allows applications to allocate or own more memory than is physically available. In practice, virtual memory utilizes two fundamental techniques: lazy allocation and swapping.

Lazy allocation is a memory management concept where memory (e.g., a virtual memory page) is allocated only when it is being accessed or needed. Using lazy allocation, a memory subsystem of an operating system (OS) can avoid giving applications memory before the applications begin execution. Lazy allocation generally works well because it is very rare for an application to touch or access all pages it requires immediately after executing and usually the working sets of programs are much smaller than their whole memory footprints. Based on this characteristic of programs, memory subsystems can let multiple applications concurrently execute, thereby improving the system overall performance without the system running out of memory.

While lazy allocation can reduce memory usage, it is still possible for all memory to be allocated, e.g., if too many applications are executing concurrently in the systems. If the memory runs out, a swapping mechanism can store the content of some pages in non-volatile storage devices so that those pages can be reused (e.g., re-allocated) by other applications.

Lazy allocation and swapping usually work as part of a kernel's page fault exception handling. For example, when memory is "allocated" (such as mmap or malloc) by programs, actually only a region of virtual memory address space is created by the kernel for the calling programs, and none of the physical pages is allocated. So, the following memory access within this newly created region may trigger a page fault exception by a hardware-implemented page walker, and then a software-implemented exception handler will check and confirm this access as legal and in turn allocates a page for it.

The exception handler may need to perform a significant number of operations to handle a page fault, from checking validity of a faulting address, acquiring a page from available free memory pages, filling the page with the corresponding data content from a storage device (e.g., major page fault) or zeroing the page (e.g., minor page fault), to creating some data structures for the memory management. Related context switch overhead associated with a major page fault may not be a serious problem if the underlying storage devices are solid-state drives (SSDs) or hard disk drives (HDDs) because access latency for such storage devices are several orders more than that of dynamic random-access memory (DRAM), and as such, in these cases, the context switch overhead would only contribute a relatively small portion of the total access latency. However, when using emerging non-volatile memories (NVM) as storage devices, related context switch overhead may be a more significant issue since these types of memory have significantly less access latency than SSDs or HDDs, and as such, in these cases, the context switch overhead would be responsible for a significant portion of the total access latency.

SUMMARY

Methods, systems, and computer readable media for performing page fault handling are disclosed. According to one method, the method includes: after a translation lookaside buffer (TLB) miss associated with a virtual memory page occurs, identifying, in a page table, a page table entry (PTE) associated with the virtual memory page; determining, using a first indicator in the PTE, that the virtual memory page is not present in a main memory; determining, using a second indicator in the PTE, that the virtual memory page is associated with a valid memory address and that the virtual memory page is capable of using pre-allocated pages; obtaining, from a pre-allocation table, a page frame number associated with a pre-allocated page; and updating the PTE to indicate the page frame number.

According to one system, the system includes at least one processor; and a page fault handling offload engine (POE) implemented using the at least one processor, wherein the POE is configured for: after a TLB miss associated with a virtual memory page occurs, identifying, in a page table, a PTE associated with the virtual memory page; determining, using a first indicator in the PTE, that the virtual memory page is not present in a main memory; determining, using a second indicator in the PTE, that the virtual memory page is associated with a valid memory address and that the virtual memory page is capable of using pre-allocated pages; obtaining, from a pre-allocation table, a page frame number associated with a pre-allocated page; and updating the PTE to indicate the page frame number.

The subject matter described herein can be implemented in software in combination with hardware and/or firmware. For example, the subject matter described herein can be implemented in software executed by a processor. In one example implementation, the subject matter described herein may be implemented using at least one computer readable medium having stored thereon computer executable instructions that when executed by the processor of a computer cause the computer to perform steps or operations. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the terms "module" and "engine" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 9 is a diagram illustrating an example process for performing page fault handling.

DESCRIPTION

Figure 1:
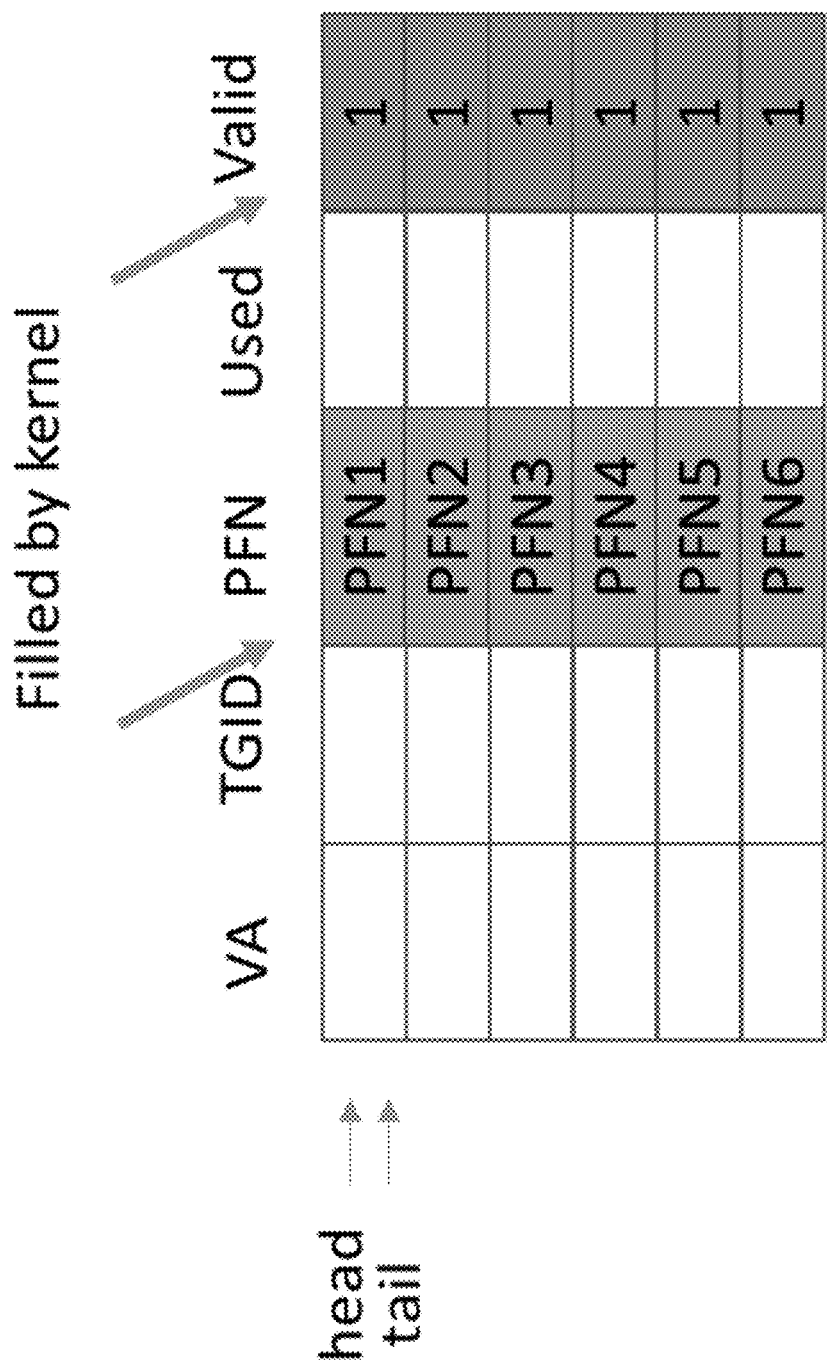
FIG. 1 depicts an example pre-allocation table associated with a page fault handling offload engine (POE) implementation.

The subject matter described herein relates to methods, systems, and computer readable media for performing page fault handling.

1 Introduction

Emerging Non-Volatile Memories (NVM), such as phase-change memory (PCM) [1], NVDIMM [2], STT-RAM [3] and 3D XPoint [4], have byte-addressability and low latency, within an order of that of main memory [85], together with the non-volatility of storage devices. These bus-attached NVMs can be seen as potential candidates of next generation of storage devices in the near future.

However, if we simply treat the NVM the same way as the traditional storage device, we will squander the benefit of much lower latency (around 5× slower than DRAM [85]) provided by NVM. For example, when a file stored in NVM is accessed and a major page fault happens, kernel does not have to block the faulting programs to trigger an input/output (I/O) request for accessing the slow traditional storage devices; instead, kernel could directly use memcpy function to copy the data content from (bus-attached) NVM to DRAM. Further, in such cases with NVM, the context switch overhead (of page fault) can be too high, compared to the access latency of NVM, and must be further avoided.

In the subject matter described herein, we consider that some types of page fault overheads can be significantly reduced. We also consider approaches for minimizing the critical path latency of page faults resulting from accessing the memory regions created by malloc and anonymous private mmap commands. Improved page fault handling is achieved by various aspects described herein, such as a page pre-allocation mechanism and background thread post-page fault handling, together with the execution of enhanced hardware page walker during the page fault. The operations of our new page fault exception handling can be divided into three parts: (1) kernel (software) page pre-allocation and legal address indication; (2) hardware page walker execution at page fault; (3) kernel (software) post-page fault handling by a kernel background worker. By doing so, the critical path of page fault exception can be reduced to only a few memory accesses.

The contributions of the subject matter described herein are as follows: a page fault handling offload engine (POE) for reducing overheads of page fault exceptions generated from accessing malloc and anonymous private mmap of user applications, details regarding a POE implementation involving a modified Linux kernel and a Gem5 emulator; and an evaluation of the POE implementation showing significant critical path latency improvement.

The subject matter described herein is organized as follows. Section 2 describes related work. Section 3 presents concepts and related features (e.g., hardware and software modifications) for performing page fault handling related operations. Section 4 explains a POE implementation involving a modified Linux kernel and a Gem5 emulator in more detail. Section 5 presents results of an evaluation of the POE implementation with some benchmarks. Section 6 provides additional thoughts.

2 Related Work 2.1 Page Fault and Context Switch

In modern computer systems, virtual memory is a memory management technique employed in most operating systems. Virtual memory is useful because it assists OSes in allowing multiple applications to launch without running out of memory. Before the virtual memory is universally adopted, an application must allocate or obtain all needed memory before starting to execute; this limitation significantly restricts the number of concurrent executing applications in a computer system as well as the overall system throughput the computer systems can provide.

In theory, virtual memory can let applications start to execute immediately without allocating any memory for themselves. The memory is dispatched when memory is needed; this is referred to as lazy allocation or on-demand paging. Since memory is one of the valuable resources in the computer systems, so memory is managed and can only be dispatched by kernel.

One way user space processes can acquire memory is through a kernel based page fault exception handling. When user applications need memory, they may initially call mmap or malloc functions. But mmap and malloc functions do not allocate any memory for applications when called; instead, these functions only create and validate a region of virtual memory address space for the calling processes and return the start address of this region.

Later, when applications access some address within this newly created region, (if no page has been allocated for this address yet), an exception would be triggered by hardware page walker, and the page fault exception handler starts to run in the kernel space on behalf of the faulting applications. Now, the mode of application is transferred from user mode to kernel mode and the page fault exception will allocate a page for this faulting address.

After the page fault exception handler completes its job, the mode is changed back to the user mode and the faulting load/store instruction is re-executed. This mode change (from user mode to kernel mode and then back to user mode) requires some "states" (e.g., local variables, hardware registers, program counter, etc.) of the user mode to be stored (or pushed) into the stack. Later operations of the page fault exception handler may involve moving those states or related state data from the stack back to their original locations so that the faulting instruction can continue to execute. In addition to the overhead of pushing into and popping from the stack, context switching may also result in some extra impacts related to cache and TLB misses.

Another technique memory can be allocated by applications is through file system read and write interfaces. This technique does not incur page faults, but does rely on system calls, which also result in context switching. Recently, some works have observed that context switching overhead incurred by file system APIs is too high when accessing emerging storage devices, such as NVM, and those works try to reduce the number of system calls. For example, Intel Storage Performance Development Kit (SPDK) [32] provides the whole NVMe driver in the user space for applications to access ultra-low-latency (ULL) SSDs based on NVM. Similarly, vNVML [86] implements a user space library for applications to access bus-attached NVM. Their idea is to access the emerging storage devices (ULL SSD and NVM, respectively) from the user space as much as possible and to reduce the number of system calls to improve the system performance.

On the other hand, Alam et al. [87] adopt a hardware helper thread to reduce the number of context switches incurred by page faults. However, their work requires a pair of registers to indicate a single region of virtual memory address space (one is for start address and the other is for end address). Therefore, their approach appears better suited for virtual machine workloads (because a guest OS will allocate a huge amount of contiguous virtual memory region from hypervisor as its physical memory), but might not be suitable for the general workloads.

2.2 Hardware Page Walker

The hardware page walker [88] is popularly employed in many modern central processing units (CPUs). After TLB misses, the hardware page walker will "walk" or analyze the page table with the faulting load or store address and CR3 register in Intel x86 architectures (page directory base register (PDBR)). If the hardware page walker can reach the lowest page table entry (PTE) of the faulting address and finds that the present bit (bit 0) of the PTE is set; meaning that a page has been allocated for this virtual memory address and its physical frame number is also stored at the PTE, then the hardware page walker can simply update the corresponding TLB entry and re-execute the faulting instruction again. Otherwise, the hardware page walker must trigger the page fault exception and let the kernel handle the page fault.

Employing the hardware page walker can reduce the number of page fault exceptions because if the hardware page walker, when reaching the lowest PTE (Page Table Entry) of a faulting address, can find the present bit is set, then the hardware page walker can directly update the corresponding TLB entry (e.g., using the faulting address and the page frame number found at the PTE) without the intervention of the kernel.

3 Design Overview

In this section, various features of an example page fault handling offload engine (POE) and related architecture are described.

3.1 Handle Page Fault Entirely from User Space or Kernel Space?

To avoid context switching associated with a page fault, intuitively, there may appear to be two "straightforward" approaches. One "straightforward" approach may involve a program being executed entirely in user space and another "straightforward" approach may involve a program being executed entirely in kernel space.

Several issues may need to be resolved to execute programs and also handle page faults solely in user space. To achieve a user space based approach, a user space library may be implemented, which might create some new data structures in user space and also map various existing kernel internal data structures (e.g., these data structures from kernel space are mapped because page faults can happen in kernel space and as such these data structures need to be accessible from kernel space), such as struct task_struct, struct mm_struct, struct vm_area_struct, struct page, and several data structures related to swapping, into user space of the library calling process.

In an example user space based approach, when a page fault happens, the hardware page walker may usually generate a page fault exception, which, instead of jumping to a usual kernel based page fault exception handler, may call a dedicated user space handler or related function and therefore may continue to handle the page fault in the user space. This approach can be implemented in almost the same way as a typical function call. Thus, after this user space exception handler finishes its page fault handling (in user space), the program can return to the faulting instruction and re-execute this instruction.

The above idea should be feasible, but it is complicated (since we have to map and maintain many data structures in user space) and it also violates security policy imposed by the Linux kernel. The reason why all user processes in Linux require to have both user space stack and kernel space stack is because the security policies of Linux ask that a process utilize its user space stack (kernel space stack, respectively) when executing in user space/mode (kernel space/mode, respectively). This is actually the main reason of context switching: before mode switching, all local variables/registers/states must be saved/pushed to the corresponding stack. However, user space page fault exception handler, which is still executed in user space regardless of mode switching, will violate this policy (because it has to map some kernel internal data structures into user space) and makes security even more vulnerable.

Due to the above-mentioned drawback, the kernel based approach may at first appear to be more feasible. However, it is impossible for user applications because they must launch in the user space.

Therefore, because the two "straightforward" approaches are not viable, we consider a more complicated approach, and utilize the assistance from hardware since pure software solutions seem unacceptable.

In our proposed approach, an enhanced the hardware page walker (e.g., hardware that can execute during the page faults) can be utilized to perform some of the page fault handling for the kernel. An implementation of an enhanced hardware page walker as described herein may be referred to as a page offload engine (POE). A feature of the proposed approach involves coordinating software (e.g., the kernel) and hardware (e.g., the hardware page walker) to perform page fault handling operations. With the help of an enhanced page walker hardware, and by reordering the operations of page fault handling software, some operations can be performed before and after the page fault (e.g., by the kernel), and some other operations can be executed (e.g., by hardware), e.g., during a page fault scenario that the POE does not handle. By doing so, at the time of a page fault, hardware may be running without the intervention of software and without requiring a context switch.

Based on the proposed approach, the following mechanisms and concepts are utilized to achieve our goal: page pre-allocation, legal virtual memory address space indication, hardware page walker enhancement, and post page fault handling by one or more kernel background thread(s).

3.2 Page Pre-Allocation

Existing page fault exception handlers usually obtain a page from a buddy system. This action may result in blocking the faulting program if no page is available and the kernel must try to obtain pages either from the page cache, or as a last resort, from writing some dirty pages to swap space. These page obtaining approaches usually require I/O requests to access backing storage devices (and the process will be blocked), so they cannot be simply executed by hardware.

In the proposed approach, pages are pre-allocated by a background kernel thread before page faults even happen. When a page is allocated, usually a pointer of a struct page (or the virtual memory address in the kernel of that page) is returned by the buddy system in the kernel. This pointer (of struct page) can be translated into physical page frame number of that page easily by page_to_pfn macro. If those frame numbers of pre-allocated pages can be saved beforehand in a certain format at a page pool (here we employ a pre-allocation table per processor core) and the POE/hardware page walker can access them easily when page fault occurs, then the operation of page allocation of the page fault handling can be moved out of the page fault critical path.

Various benefits can be realized by using page pre-allocation, e.g., speed and reducing complexity of page fault handling systems or related mechanisms. For example, since allocating pages can block faulting user applications, page pre-allocation by a kernel background thread only blocks this kernel thread and will not slow down the user applications. In another example, in an existing Linux kernel (e.g., one without POE functionality), to allocate pages for malloc or anonymous private mmap, the kernel always "zeros" an entire page (4 KB) or an entire huge page (2 MB) in the page fault critical path for security. An example pre-allocation mechanism as described here can move this time consuming operation out of the page fault critical path. In another example, by utilizing kernel background threads to perform page pre-allocation, hardware enhancements for a POE implementation may be less complex, e.g., relative to an implementation that requires the hardware to do page pre-allocation or page allocation on demand.

3.3 Legal Virtual Memory Address Space Indication

A significant part of existing page fault handling operations involve checking whether the faulting virtual memory address is legal (e.g., valid) or not (e.g., does the address lies within the valid "good_area" or the invalid "bad_area"? This checking operation is very complicated and is unlikely to be handled by hardware. However, the faulting virtual memory address can only be known at the moment that the page fault is about to happen; how can a POE know whether the faulting virtual memory address is a legal or illegal address?

It seems to be a very challenging problem, but, by thinking in the opposite direction, we discover a very elegant solution. Instead of finding out the validity of a faulting address using hardware, the proposed approach involves software informing hardware if the faulting address is legal or not.

In some embodiments, POE may be configured to handle some page fault scenarios, while allowing other page fault scenarios to be handled by existing page fault handling mechanisms. For example, the POE implementation described herein may be configured to handle page faults happening only in the user space, particularly page faults occurring when accessing virtual memory address space regions created by malloc and anonymous private mmap functions within user applications.

When a user application calls a malloc or an anonymous private mmap function, a virtual memory address space area may be created and a pointer pointing to the start virtual memory address of this area may returned to applications. As such, the kernel can know which address is legal when these two functions are called. The only thing left is that we need a mechanism to inform a POE of this information.

Since a POE or a related hardware page walker walks through page tables and corresponding page directories, such as a page middle directory (PMD) and a page global directory (PGD), of current running processes after TLB misses, the proposed approach involves adding an "indicator" in this page table walking path to inform the POE that whether a current accessing memory address is legal. In some embodiments, the valid memory address indicator may be stored as a bit or parameter of a relevant PTE.

In some embodiments, the proposed operational flow is as follows. When a user application calls a malloc or an anonymous private mmap function, and before the system call returns, a background thread (e.g., a separately executing process) is created by the kernel. This kernel background thread, similar to a hardware page walker, may walk a page table for evaluating or analyzing all pages within the newly created (e.g., allocated) virtual memory address region in the background (e.g., the thread runs asynchronously to the user application and/or other processes). In some embodiments, the kernel background thread may be run until all PTEs have been accessed and/or analyzed. The kernel background thread may be configured to set a "POEable" bit as a legal address indication for each PTE associated with pages within the newly created (e.g., allocated) virtual memory address region. If the paths to PTE of some addresses have not been constructed yet, the kernel can construct these paths, e.g., like an existing exception handler does. By having a kernel background thread asynchronously perform this path construction process, this process can also be moved out of the page fault critical path.

3.4 Hardware Page Walker Enhancement

In some embodiments, a POE implementation may include an enhanced hardware page walker configured to perform some page fault handling related operations, and a POE related mechanism or software (e.g., a modified kernel) may be configured to perform to execute other operations (e.g., not handled by the enhanced hardware page walker and to execute those operation out of the page fault critical path, such as before or after a page fault, using software (e.g., kernel background thread(s)).

From the above-mentioned features, we have a pre-allocation page pool containing page frame numbers of available pre-allocated pages and POEable bits, as indicators, have been set at PTEs of legal address space. Therefore, the operations of POE may be as follows: When TLB misses, POE (e.g., an enhanced hardware page walker) may walk a relevant page table until it reaches a PTE associated with a faulting address. If POE finds out that the POEable bit is set (meaning the faulting address is legal), but the present bit is not set yet (meaning that this address has not been allocated a page, so POE needs to allocate a page for it), then POE requests a free page from pre-allocation page pool, stores its page frame number as well as sets some flag bits into the PTE as software exception handler does, refills this missing TLB entry, and continues to execute the faulting instruction without the need of kernel help.

However, for other cases different from the above-mentioned scenario, the POE may trigger a typical page fault exception similar to an existing Linux based page fault exception handler approach and let software (e.g., the kernel) handle it.

3.5 Post-Page Fault Handling by Kernel Background Thread(s)

In some embodiments, besides the page allocation, the address validation, and PTE update, there are other page fault handling related operations, such as increasing a counter of an mm object (by calling inc_mm_counter function) and adding a page to a last recently used (LRU) cache for swapping later. Such operations can be delayed and executed later by another periodic background kernel thread if programs are not terminated. In some embodiments, another thread or process may perform error handling operations or functionality. For example, actively scan and process unprocessed pages in pre-allocation tables only if programs are being terminating. Thus, this processing can also be moved out of the page fault critical path.

4 Implementation

In this section, an implementation of POE hardware and related (e.g., implemented or potential) features and/or aspects are discussed. Single-threaded implementations and uses are addressed initially, and multi-threaded applications implementations and uses are addressed later in the section.

4.1 POE Enable and Disable

An POE implementation described herein may utilize or be trigged by various POE related system calls or functions. In particular, applications may call a POE_enable system call in the beginning of their source code, and no other extra change is required to use POE functionality. The POE functionality may be automatically disabled by a POE_disable( ) function called inside _mmput( ) function by the kernel, e.g., when applications are about to be killed. An POE_disable system call may also be available, which can directly call the POE_disable( ) function and allow applications to disable POE functionality if necessary.

In some embodiments, the POE implementation may include kernel based POE software where operations of POE_enable and POE_disable system calls can be executed when the POE software is loaded and unloaded, respectively. By doing so, user applications may automatically enable POE by default. However, system calls method may be preferable in some scenarios because it makes debugging much easily (e.g., the number POE users can be limited within some caller applications, rather than all user applications in the systems).

In some embodiments, "POE is disabled" refers to a scenario where newly created virtual memory address spaces do not support POE. In such scenarios, page faults in those regions may be handled by a kernel based page fault exception handler. However, in such embodiments, previously created POE enabled regions (e.g., regions that are still "POEabled") may continue utilizing POE related mechanisms for relevant page faults.

4.2 POE_Enable System Call

In some embodiments, a POE_enable system call may set the POE_enable, a boolean type member of struct_mm, as true for the caller's mm object. The first POE_enable caller may also construct the pre-allocation page pool, e.g., as a pre-allocation table per processor core. For example, the "pre-allocation table" may refer to physical contiguous pages allocated from the kernel's buddy system. The amount of pages (to construct a single table of a processor core) depends on how many pages are to pre-allocated or contained in a table, which is configurable. In some embodiments, to shorten the time spent executing a POE_enable system call, only pages to construct pre-allocated tables may be allocated here, and the pre-allocated pages themselves contained within these tables may be allocated later by a background thread.

In some embodiments, after constructing a pre-allocation table per processor core, a schedule_on_each_cpu( ) kernel function may be executed to set the page frame number (34 bits) of the first page of the pre-allocation table, the number of entries of pre-allocation table (16 bits), and POE_ENABLE bit (1 bit) to a new 64 bits register (e.g., the CR9 control register is employed in the POE implementation) per processor core in order to enable POE hardware of all processor cores. In the POE implementation described herein, the numbers of entries of pre-allocation tables are configured as sixty-four, but the entry number per table are configurable and different numbers may be used from table to table.

In some embodiments, at the end of a POE_enable system call, a kernel thread is triggered to pre-allocate pages, in the background, for pre-allocation tables of processor cores. Because allocating pages per processor core can be very time-consuming, e.g., consider platforms with hundreds of processor cores, adopting a kernel background thread can avoid blocking the execution of the first POE_enable caller program.

Although it is possible that POE hardware may request (pre-allocated) pages from some pre-allocation tables before the above mentioned asynchronous kernel thread is executed (or before the kernel thread has a chance to allocate any page), the POE implementation can still trigger a typical page fault exception. In other words, the POE implementation can handover the task to the kernel to handle a page fault scenario where the POE implementation cannot obtain pages from a relevant pre-allocation table.

4.3 Pre-Allocation Table

In some embodiments, a pre-allocation table may utilize a lockless ring buffer architecture [89] with one producer (the kernel, which produces/pre-allocates pages) and one consumer (the POE implementation, which consumes/requests pages). Each entry of the pre-allocation table may have sixteen bytes, and the first entry (entry number 0) stands for the table header, which contains the head index (ranging from one to the number of entries), tail index (also from one to the number of entries), number of table entries, and locks, and the size of each of them is four bytes. Except for the table header, all the entry's format is delineated in FIG. 1. FIG. 1 shows an example pre-allocation table and its fields, which contains faulting virtual memory address, TGID, page frame number, used bit, and valid bit.

In some embodiments, the producer may look at the head index, and the consumer may check the tail index. For example, when the kernel (producer) wants to pre-allocate a page, first it looks up the corresponding entry of the head index from table header. If this entry is not valid (e.g., the valid bit is not set), meaning that this entry does not contain a valid pre-allocated page, then the kernel may allocate a page and put its page frame number into the corresponding field of this entry, may increment the head index by one, and may check the next entry. The kernel may continue this page pre-allocation process until it reaches an entry whose valid bit has already been set (e.g., indicating that all entries of this table are valid).

In some embodiments, since a table is dedicated to a processor core, page pre-allocation performed by the kernel may follow some policies and/or rules. For example, if a platform contains multiple non-uniform memory access (NUMA) nodes, then pages can be pre-allocated from near memory first. When near memory is exhausted, the kernel can decide either to pre-allocate pages from far memory, or not to pre-allocate pages at all. After all pages (from near memory) are used from this table, a POE can trigger a typical page fault exception and let a kernel based page fault exception handler decide the next step.

4.4 Pre-Page Fault Software Handling

When applications call malloc or anonymous private mmap, if the kernel determines that the POE_enable member of the mm object is set as true (e.g., by a POE_enable system call), then the kernel may add a new VM_POE flag to the virtual memory area (vma) object (of the struct vm_area_struct) when this new vma is created.

At or near the end of mmap or anonymous private malloc functions, the kernel can create a background kernel thread by executing a kthread_run( ) function. This kernel thread, since it knows the start and end addresses of the newly created vma, can walk the page table of the calling process until it reaches (accesses) all the corresponding lowest level PTEs; if the paths to PTEs have not been constructed yet, this kernel thread may construct them as page fault exception handler does.

Figure 2:
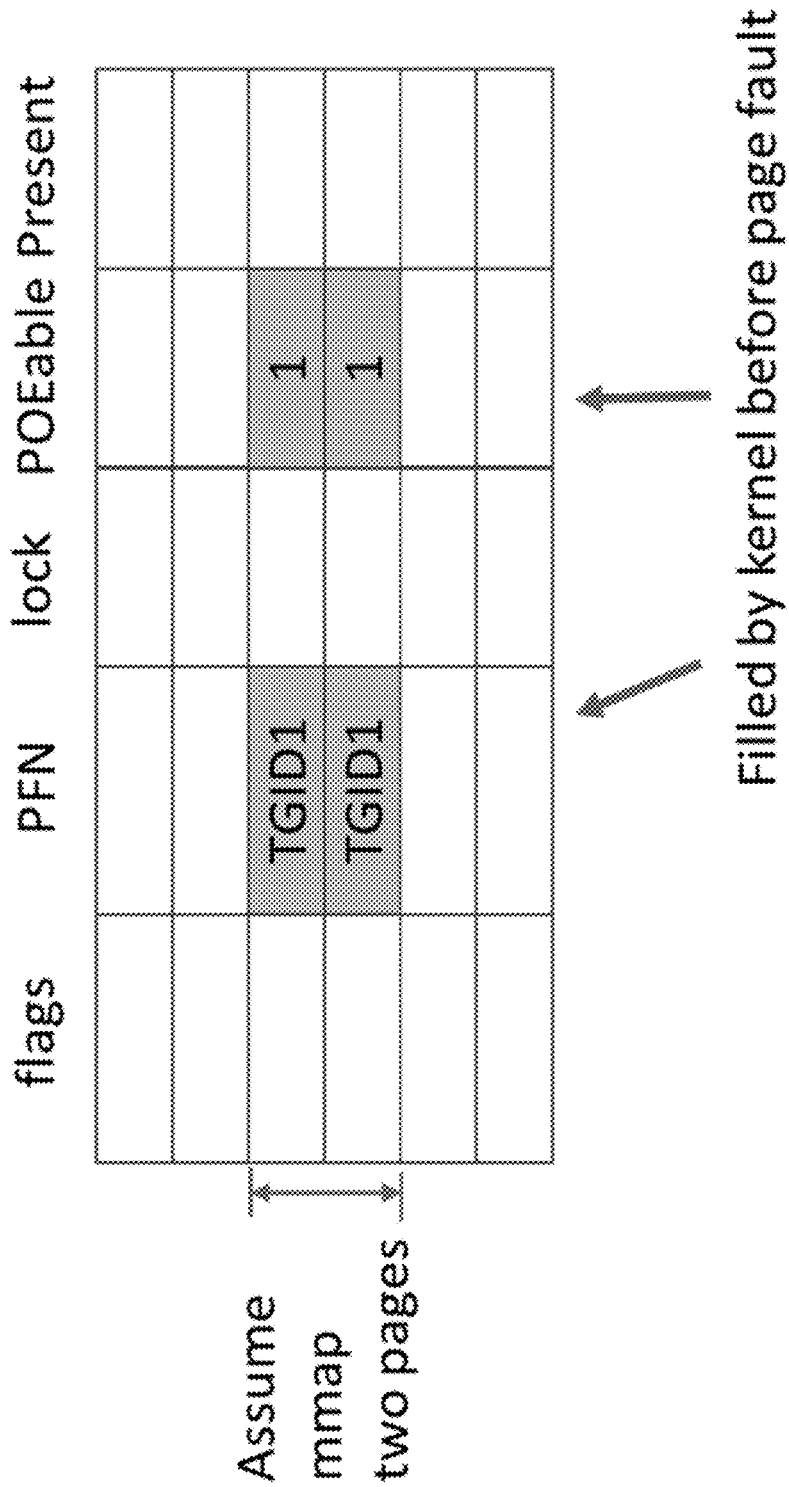
FIG. 2 depicts example page table entry (PTE) data associated with the POE implementation.

When a PTE is reached, the kernel thread may set a POEable bit (e.g., bit 2) and a RW bit (e.g., bit 1, if the region is writeable) of the PTE if a present bit of this PTE is not set yet. In some embodiments, bit 2 (the user bit) of a PTE may be used or repurposed as the POEable bit, which is safe since this bit is not involved in a swap entry computation. Besides these two bits, the kernel background thread may also write a thread group identifier (TGID) of a current process into the page frame number (PFN) field of the PTE. FIG. 2 shows pre-page fault handling operations. For example, FIG. 2 depicts example data (e.g., a context) of the lowest level PTEs of a POE enabled process. As shown in FIG. 2, the mmap function maps two pages and sets the TGID and POEable bit.

In some embodiments, a kernel thread may execute pre-page fault handling operations asynchronously to avoid blocking programs for too long since such operations could be time-consuming, e.g., if applications malloc or mmap a huge, say 1 GB, region. Also, if a POE reaches a PTE of a page which is "pre-allocatable" but its POEable bit has not been set by the kernel background thread, then the POE can simply treat this page fault as usual and trigger a typical page fault exception.

4.5 Page Fault Hardware Handling

In some embodiments, the POE implementation (e.g., acting an enhanced hardware page walker) may start to execute operations after TLB misses. Some operations of the POE implementation are described below.
1. If POE cannot reach (the lowest level) PTE, then it triggers the page fault exception as usual.
2. If POE can reach (the lowest level) PTE and the present bit of the PTE is set, then POE updates the TLB entry and re-executes the instruction again.
3. If POE can reach (the lowest level) PTE and the present bit of the PTE is not set, and the POEable bit of the PTE is not set (meaning that this page cannot be pre-allocated), then POE also triggers the page fault exception as usual.
4. If POE can reach (the lowest level) PTE and the present bit of the PTE is not set, but the POEable bit of the PTE is set, then POE stores the TGID (written by kernel at section 4.4) obtained from a PFN field of the PTE, obtains a page (e.g., by looking up the corresponding entry indicated by the tail index and checking that the valid bit of this entry is set) from the pre-allocation table of the current executing processor core, fills its page frame number into the PFN field of the PTE, and sets some corresponding flags (for read: the present, accessed, and nx bits are set; for write: besides the three bits mentioned above, dirty bit and soft dirty bit are also set) into the PTE. The user bit (bit 2) and RW bit (bit 1, if applicable) are already set by the pre-page fault kernel thread. (If the valid bit of a tail entry is not set, e.g., indicating that this entry does not contain valid page and that the whole pre-allocation table of this processor core is empty, then POE would trigger a typical page fault exception.)
5. POE updates the TLB entry, writes the faulting virtual memory address, stores the TGID, set the used bit for the tail entry of the pre-allocation table, cleans the valid bit of the tail entry, and increments the tail index by one.

Figure 3:
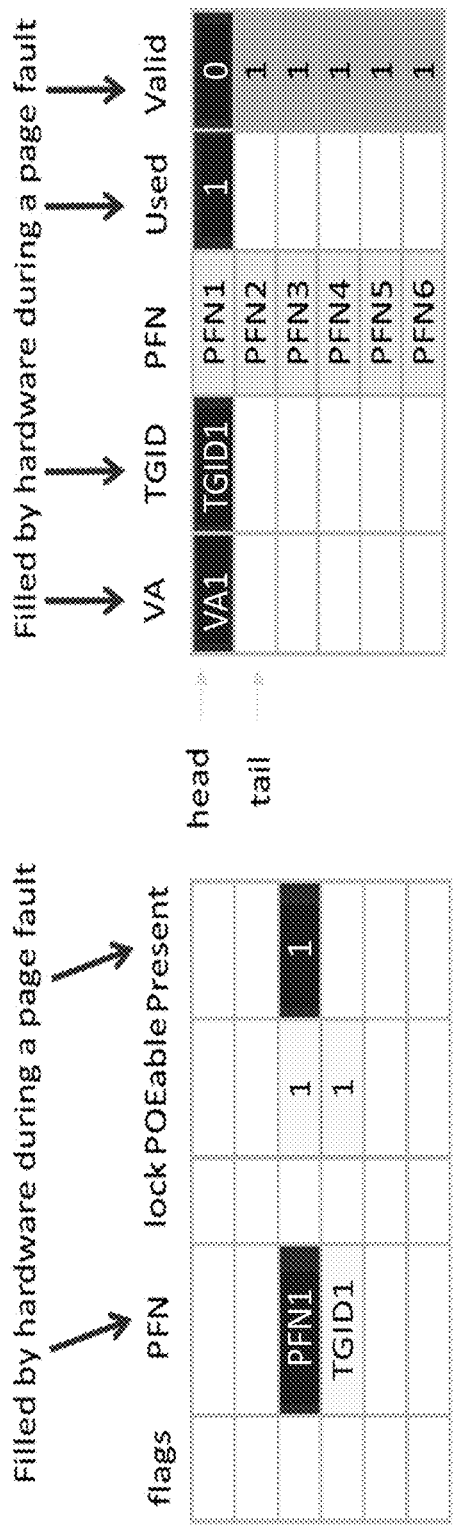
FIG. 3 depicts example PTE data and pre-allocation data during operation of the POE implementation.

FIG. 3 shows operations of an example POE implementation during a page fault. As shown in FIG. 3, the left table represents PTEs and the right table is a pre-allocation table. The POE implementation makes page fault critical latency quite small: except for regular memory loads to walk the page table and the PTE entry update, which are also required operations of existing page fault exception handling, POE only incurs one four bytes load (read the tail index), one eight bytes load (read PFN field and valid bit of the tail entry), one sixteen bytes store (update the entire tail entry), and one four bytes store (update the tail index).

4.6 Post-Page Fault Software Handling

A Linux delayed work queue is utilized to periodically execute post-page fault processing. After pages of pre-allocation tables are pre-allocated by a background thread triggered by POE_enable system call, a delayed work queue function is scheduled, with a delay timer is set as 2 milliseconds (ms). When the delay timer expires, a delayed work function is executed to do the post-page fault handling.

This post-page fault handling may be described as follows. First, it uses the head index to get the corresponding (head) entry. If the head entry's used bit is set, since the TGID, faulting virtual memory address, and page frame number can be found at the used entry, then the following functions may be executed: anon_vma_prepare, inc_mm_counter, page_add_new_anon_rmap, and lru_cache_add_active_or_unevictable for a single page. After those functions are executed, the used bit is cleared.

Figure 4:
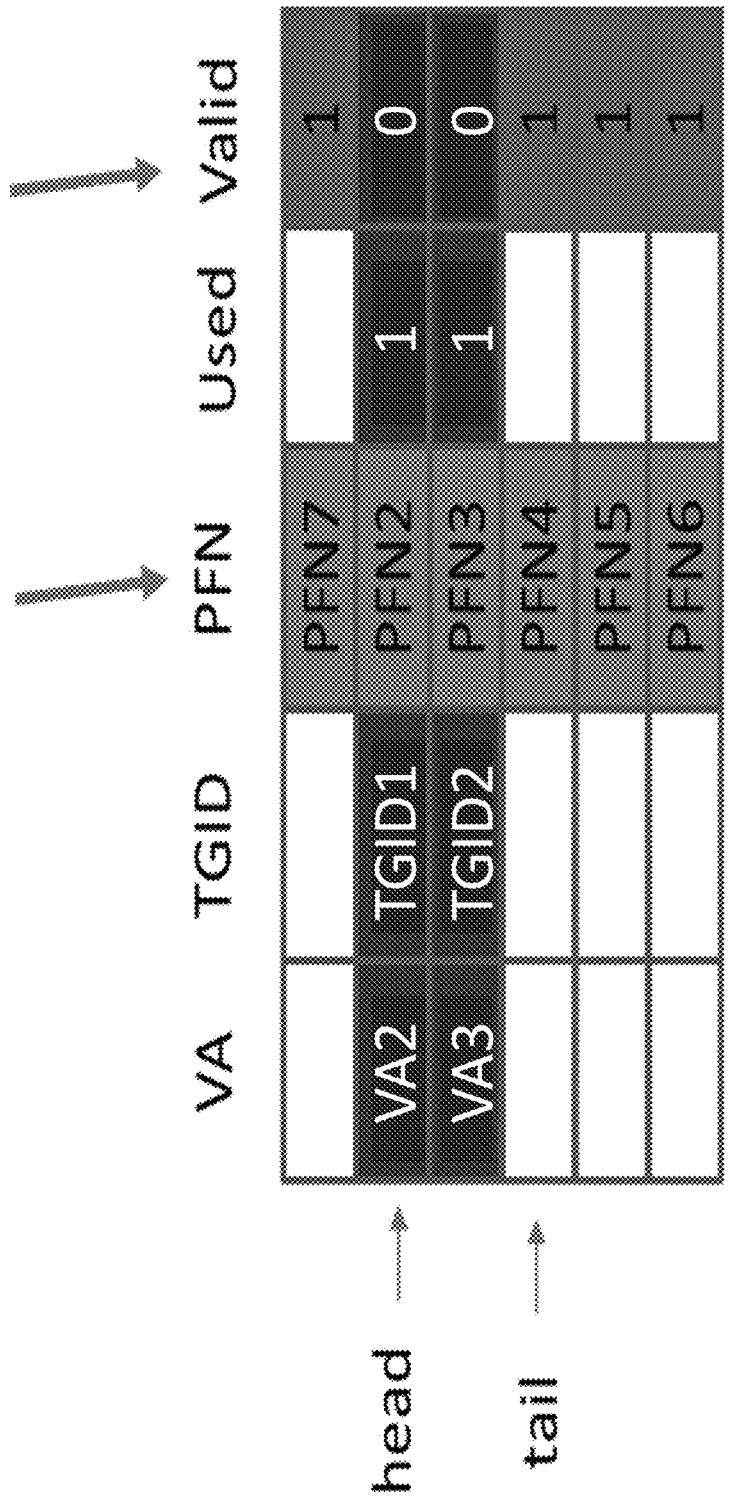
FIG. 4 depicts example pre-allocation data associated with post-page fault handling operations of the POE implementation.

Besides the above-mentioned operations, the delayed work function is also responsible for refilling the used entries of pre-allocation tables. That is, if the valid bit is cleared, then delayed work function will pre-allocate a page, write its page frame number, set the valid bit into the head entry, and increment the head index by one. The delayed work function may continue to process and refill the next entry until it meets an entry whose valid bit is set. FIG. 4 illustrates the operations of post-page fault processing.

If pages cannot be pre-allocated due to the lack of memory, delayed work function may still continue to do the post-page fault handling for the following used entries, without increasing the head index. After all entries are processed, the delayed work function is re-scheduled for the next time (2 ms).

4.7 Error Handling

Since the delayed work function is only executed every 2 ms, what happens during this period if an application is terminated and some pages are still not processed by the delayed work function?

In some embodiments, an error handling function may be utilized to handle those pages. For example, an error handling function may scan all pre-allocation tables and finds out the used entries (e.g., by determining if a used parameter data field or a used bit of the PTE is set) whose TGID is the same as the terminated application. If such entries exist, then the error handling function executes the same functions as delayed work function does. Also, since error handling function and delayed work function might execute concurrently, a lock may be used to avoid a race condition between them. The bit 0 of locks field in the table header is employed as a test_and_set lock bit here.

Because the error handling function may need to scan all pre-allocation tables and it may be configured to only scan whenever necessary. Therefore, the error handling function may be called at the zap_pte_range( ) function and when the page's page_mapcount( ) returns zero as well as the vma's VM_POE flag is set. This can significantly reduce the frequency of calling the error handling function since page_add_new_anon_rmap will not be called for those unprocessed pages, so the values of their _mapcount of struct page are still −1 as well as the page_mapcount function will return zero.

4.8 POE_Disable Function and POE_Disable System Call

The POE_disable function sets the caller's POE_enable member of the mm object as false. The last caller of POE_disable first waits until the delayed work function is completed or cancelled. Then, like POE_enable, this last caller disables POE hardware of each processor core by calling schedule_on_each_cpu( ) function to clear the POE_ENABLE bit for all processor cores, and it also frees/releases valid pages (whose valid bit is set) of pre-allocation tables.

As we have mentioned at section 4.1, the POE implementation may be configured to automatically disabled by POE_disable( ) function from _mmput( ) function by the kernel when applications are terminated. So disabling POE within the source code of applications is unnecessary. However, a POE_disable system call is implemented to allow applications to disable POE if they want. The POE_disable system call directly calls POE_disable function. Also, a protection has been implemented so that calling POE_disable function twice accidentally will not be harmful. The second POE_disable system call will directly return.

4.9 Huge Page Support

The POE implementation can also support huge (e.g., 2 MB) pages. In some embodiments, the POE implementation may utilize an additional pre-allocation table per processor core to contain pre-allocated huge pages for a given processor core. The kernel background thread described in section 4.4 may set the POEable bit at a PMD if a huge page can be allocated for certain virtual memory address regions. When POE reaches the PMD and finds the POEable bit is set but that the present bit is not set, the POE implementation may obtain a huge page from the pre-allocated table.

4.10 Multi-Threaded Process

The previous portions of Section 4 describe various interactions between the POE implementation and the kernel for a single-threaded process. How about a multi-threaded process? For example, two or more threads may access the same page and therefore encounter the page fault (of the same page) at the same time. Furthermore, we should consider a more complicated race condition case between POE hardware and a kernel software page fault exception handler.

As indicated in section 4.4, a kernel background thread can set the POEable bit for PTEs. Consider this example, the POE hardware reaches a PTE before the background kernel thread sets its POEable bit. In this example, the POE hardware may treat this page as "non-POEable" and trigger a page fault exception. Before the page fault exception handler executes, the kernel background thread may be scheduled and may set the POEable bit of this PTE. Continuing with this example, POE hardware from another processor core could reach this PTE (e.g., since its present bit is not set but its POEable bit is set) and may execute the POE page fault handling. Meanwhile, the page fault exception handler triggered from the first processor core may execute and start to handle the page fault for the same faulting page. This might be a serious issue, so we have to avoid it.

To address this potential issue, a lock mechanism may be utilized. For example, a test_and_set lock at PTE may be employed. In this example, when POE hardware or a kernel based page fault exception handler want to handle or service a page fault (e.g., the kernel can check the VM_POE flag from vma to decide if it needs to get the lock or not), they each need to obtain a lock at the PTE first.

In some embodiments, an accessed bit (e.g., bit 5) of a PTE may be utilized or repurposed as the lock bit. In such embodiments, the flow of section 4.5 may be modified as follows. If a POE can reach the PTE and the present bit is not set, but the POEable bit is set, then the POE can perform a test_and_set action to acquire the lock. For example, if a PTE is just read and cached, this test_and_set action may only access the cache and does not need to access memory. If the returned value from test_and_set is zero or indicating unlocked, then POE may continue to proceed as described in section 4.5. After that, the POE may clear the lock bit to unlock it.

However, in some embodiments, if the returned value from test_and_set is one or indicating locked (e.g., if another POE from another processor core or a kernel based page fault exception handler is handling a page fault for the same page), then the POE may busy wait (e.g., repeatedly check) until the lock bit is clear and the present bit is set (which indicates that the corresponding page fault has been solved), and updates the TLB as well as re-executes the faulting instruction.

This lock-based approach is more scalable compared to an existing kernel based page fault exception handler approach that uses a global page table lock. In particular, in some embodiments, the POE only busy waits at the page level, and this busy wait happens only when multiple POEs try to access the same page simultaneously. However, an existing kernel based page fault exception handler may use a global page table lock to synchronize all page faults of the threads belonging to the same process. Therefore, for a kernel based page fault exception handler approach that uses a global page table lock, all faulting threads of the same process must busy wait no matter if their faulting pages are the same or not.

4.11 Comparison with Existing and POE Page Fault Handling

Figure 5:
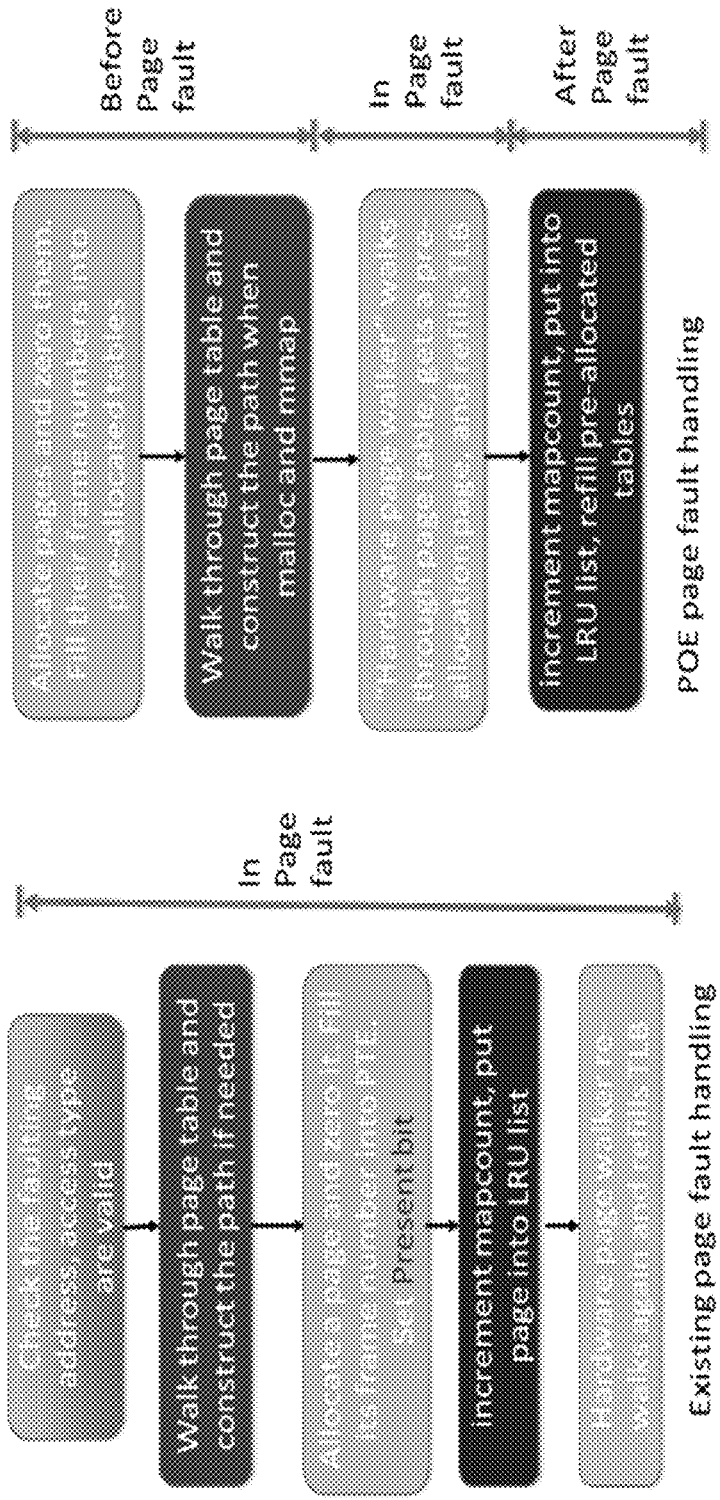
FIG. 5 depicts example workflows of a pre-existing, kernel based page fault exceptions handling and POE page fault exceptions handling.

FIG. 5 shows flows of existing kernel based page fault exceptions handling and POE page fault exceptions handling. As indicated in FIG. 5, the POE implementation re-orders various fault handling operations, moves many of the operations out of the page fault critical path, thereby leaving less operations for the POE hardware (e.g., the enhanced hardware page walker) to process.

5 Evaluation

Since the proposed POE approach utilizes features of an enhanced hardware page walker and a modified kernel, existing CPU hardware may be modified for executing the modified Linux kernel. We employ an Gem5 [90] emulator to modify and emulate our new POE hardware. The Gem5 platform is configured as four-processor core 3.4 GHz X86 TimingSimple CPU with 8 GB DDR4 main memory using Ruby memory model. A Gem5 full system (FS) simulation is employed and Linux kernel version 4.9.182 is modified and used in our evaluations.

5.1 Results of Page Fault Critical Latency

Figure 6:
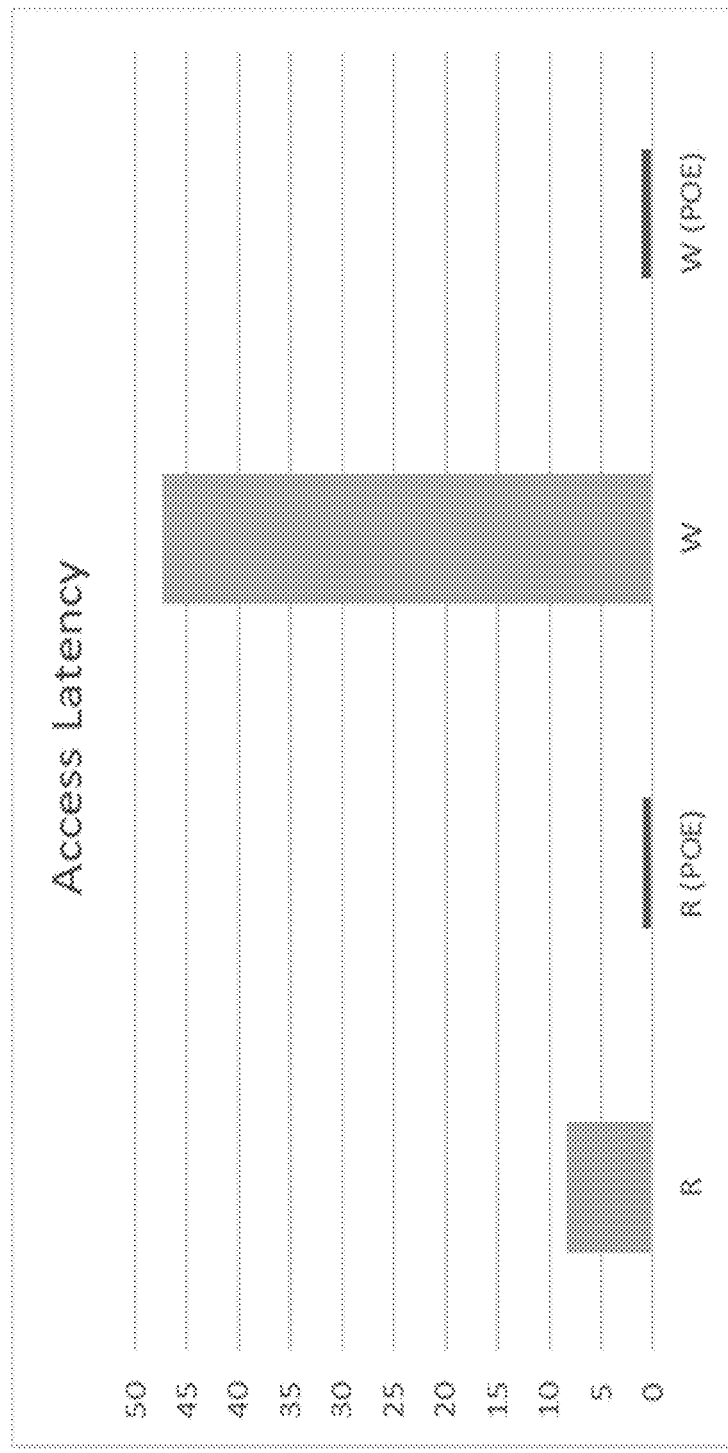
FIG. 6 depicts access latency associated with a normalized critical path cycle of a page fault of the POE implementation and an existing kernel based page fault handler.

We evaluated the improvement of the page fault critical path latency associated with our implementation of a POE. We conduct experiments inside the Gem5 FS environment. We run a simple program which mmaps an anonymous private memory region and accesses one byte per page within this region; total 100 pages are accessed and their results are averaged and reported. We compare the read and write access latency between the POE implementation and an existing kernel based page fault handler. FIG. 6 shows access latency associated with a normalized critical path cycle of a page fault of the POE implementation and an existing kernel based page fault handler. W stands for write page fault, and R stands for read page fault. From the data in FIG. 6, some conclusions can be drawn.

Our evaluation shows that the POE implementation works in a Linux and Gem5 FS environment. The hardware and software of the POE implementation cooperate to resolve the page faults and therefore result in very short critical path latencies.

Further, the critical path latencies of read and write page faults of the POE implementation are very close, less than a hundred processor cycles apart. This is because the POE hardware allocates a new page for a page fault, regardless of whether it is read or write related fault. So the POE operations for read and write page fault handling are the same, and their latency should be the same, too.

However, an existing kernel based page fault exception handler may handle page faults caused by read and write differently if page faults happen within the regions created by malloc or anonymous private mmap. For example, a Linux kernel may always map the faulting address to a special "zeroed" page for read page fault, and may allocate a new page for write page fault later. Since mapping to a special "zeroed" page does not require zeroing the page again, the critical path latency of a read fault is much shorter than that of a write fault. We can see from the FIG. 6 that the W (write page fault) has the worst critical path latency since it incurs both the overheads of the context switch and zeroing the page.

Furthermore, the critical path latencies of the POE implementation are much better than the critical path latencies of an existing Linux page fault exception handler in the Gem5 FS environment. The read latency is improved by a factor of 8.3 and the write latency is improved by a factor of 47.3 times when compared to a traditional Linux page fault exception handler.

5.2 Results of Micro Benchmarks

In this section, we estimate the improvements of POE by executing micro benchmarks. However, we do not/cannot directly run those benchmarks inside the Gem5 FS environment because the Gem5 FS environment does not support all X86 instructions (so many benchmarks cannot run directly in Gem5 FS mode) and because the Ruby memory model of Gem5 is too slow and is not good enough. We conduct the same experiment described at section 5.1 in the Gem5 FS environment and in a real machine and compare their results.

For critical path latency of write page faults, the Gem5 average is 39203 cycles and but the real machine average is 15024 cycles.

Therefore, we count the number of total page faults of the benchmarks and estimate the percentage of expected improvements provided by the POE implementation on a real machine.

We use a machine with 32 GB DRAM, and Intel i7-4770 four-processor core 3.4 GHz processor with hyperthreading enabled. Linux kernel 4.9.182 version is employed on this machine, too.

We measure page fault critical path latencies as explained in section 5.1 on a real machine, but we average results of 4096 pages instead of 100 pages. We execute the same (4096 pages) measurements in the Gem5 FS environment to get the page fault latency when POE is enabled. Table 1 summarizes these measurements. In particular, Table 1 shows average critical path cycle counts of a page fault and POE latency is measured in a GEM5 FS environment.

TABLE 1

|  | POE | WRITE ON REAL MACHINE | READ ON REAL MACHINE |
| --- | --- | --- | --- |
| CYCLE COUNTS | 431 | 3678 | 1158 |

Next, we configure all the benchmarks as single-threaded, and measure their total execution time and the number of write and read page faults resulting from malloc and anonymous private mmap.

The numbers of page faults are then multiplied by the difference of latency of read faults and POE latency (1158-431) and the difference of latency of write faults and POE latency (3678-431) cycle counts and then each difference is divided by 3.4 G to get the time expected (in seconds), which gives us the time saved by the POE implementation. Finally, the expected time is divided by total execution time of the benchmarks to obtain the percentage of improvement provided by the POE implementation.

Figure 7:
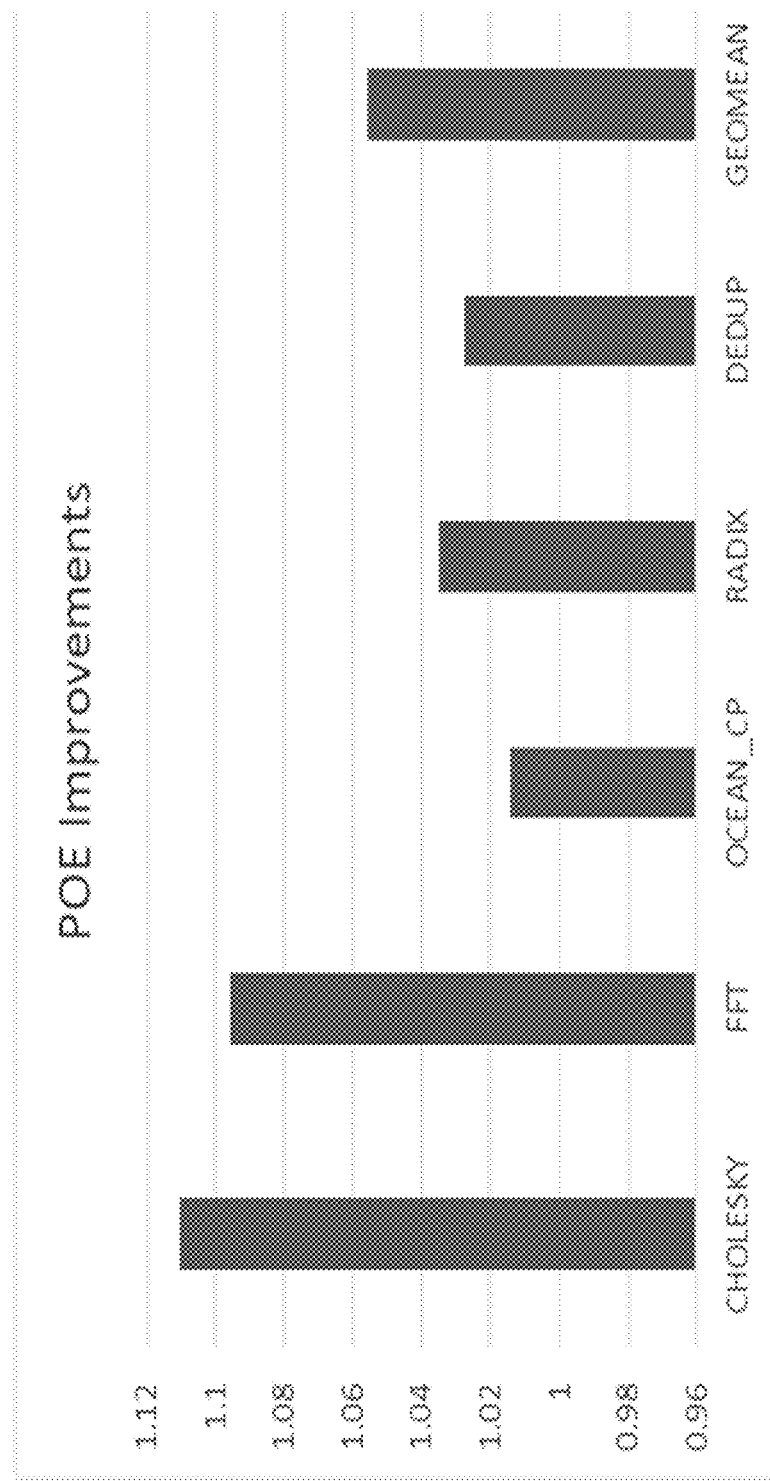
FIG. 7 depicts improvement provided by the POE implementation described herein using various benchmarks.

We leverage the PARSEC 3.0 [79] and SPLASH-2X [80] benchmark suites with native input sets. FIG. 7 depicts improvement (%) provided by the POE implementation described herein using various benchmarks. As indicated in FIG. 7, an average 5.6% improvement is observed.

6 Additional Thoughts

An evaluated POE implementation along with various potential embodiments and/or related features are discussed in the subject matter described herein. In the evaluated implementation described herein, the POE includes an enhanced hardware page walker and a modified Linux kernel to reduce the critical path latency of the page fault handling. In the evaluated implementation, a kernel background thread is utilized to execute some of the operations of page fault handling, asynchronous to the actual page fault while letting hardware carry out operations that need to be handled at the time of the page fault.

We implemented the kernel modifications in Linux and simulated the enhanced hardware in a Gem5 emulator. We have shown that our implemented POE could significantly reduce the page fault critical path latency when virtual memory address regions created from malloc and anonymous private mmap are accessed.

The evaluation shows that the page fault critical latency can reduce to 2.1% for write and 12% for read of existing software exception handling times. In addition, our implemented POE can improve the execution time of some benchmarks by an average of 5.6%.

Figure 8:
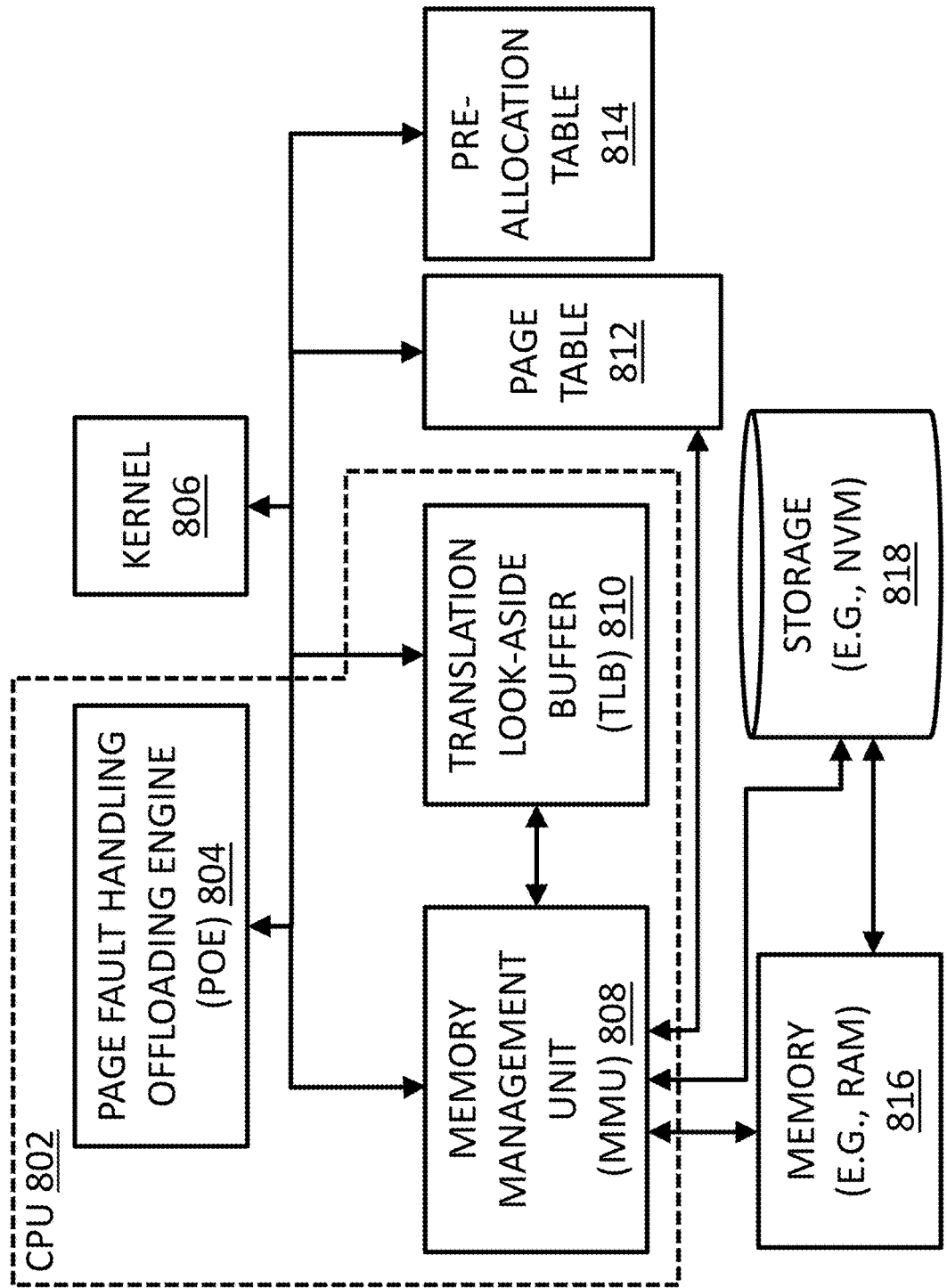
FIG. 8 is a diagram illustrating an example computing environment for performing page fault handling.

FIG. 8 is a diagram illustrating a computing environment 800 for performing page fault handling and/or related operations. Referring to FIG. 8, computing environment 800 may represent various computing architectures, such as an x86 architecture, an x86-64 architecture, an ARM architecture, or other architectures. In some embodiments, computing environment 800 may include one or more computing platforms, memory devices, and/or other hardware. For example, computing environment 800 may include a processor or central processing unit (CPU) 802, a kernel 806, a memory 816, and a secondary storage 818.

CPU 802 may represent one or more physical processors, such as an x86 based processor, an x86-64 based processor, an ARM processor, or another processor. CPU 802 may also include electronic circuitry or other hardware (e.g., controllers, caches, buffers, and/or other entities) for performing various functions, e.g., virtual memory management, page fault exception handling or other features.

CPU 802 may execute instructions associated with kernel 806, user applications, and/or other programs. Kernel 806 may represent a particular portion of an OS. For example, kernel 806 may be a modified Linux kernel that includes a kernel based page fault exception handler and POE software configured to utilize POE related system calls and functions from applications or other entities. In this example, e.g., when particular system calls or functions calls are made, kernel 806 may be configured to initiate or trigger one or more background threads for facilitating one or more page fault handling operations associated with a POE 804. In some embodiments, POE software may be implemented as a kernel module, and POE 804 may be initiated when the module is inserted into the kernel, such as a insmod Linux command, without the help of system calls of function calls.

In some embodiments, one or more kernel associated background threads may execute pre-page fault handling operations, e.g., asynchronously to other processes and/or periodically. For example, a pre-page fault operation may include pre-allocating virtual memory pages for use by a processor core and storing corresponding page frame numbers in a pre-allocation table 814 for use by the processor core. In another example, a pre-page fault handling operation may include determining whether PTEs associated with a virtual memory region refer to valid memory addresses and setting valid memory address indications in the PTEs associated with the virtual memory region.

In some embodiments, one or more kernel associated background threads may execute post-page fault handling operations, e.g., asynchronously to other processes and/or periodically. For example, a post-page fault operation may include updating one or more counters of pre-allocation table 814, adding one or more virtual memory pages to an LRU cache for swapping, or allocating one or more pre-allocated pages to replace used pre-allocated pages associated with pre-allocation table 814.

In some embodiments, one or more kernel associated background threads may execute error handling operations, e.g., asynchronously to other processes and/or periodically. For example, an error handling operation may include scanning one or more pre-allocation tables 814 for entries associated with terminated applications and performing one or more post-page fault handling operations for each of the entries associated with terminated applications.

In some embodiments, CPU 802 may include a POE 804, an MMU 808 and a TLB 810. POE 804 may be implemented using hardware (e.g., circuitry associated with CPU 802) and/or a processor and may include hardware page walker functionality along with additional features. In some embodiments, POE 804 may be configured to handle page faults occurring in user space, e.g., read and write page faults occurring when accessing virtual memory address space regions created by malloc and anonymous private mmap functions within user applications. In some embodiments, POE 804 may be configured to handle page faults occurring in kernel space, e.g., virtual memory address space regions created by kmalloc.

In some embodiments, POE 804 may be configured to perform a page walk of page table 812 associated with a TLB miss. If POE 804 cannot reach a relevant (e.g., the lowest level) PTE corresponding to the TLB miss, then POE 804 may trigger the page fault exception that is handled by the kernel. If POE 804 can reach a relevant (e.g., the lowest level) PTE corresponding to the TLB miss and the present parameter data field of the PTE is set, then POE 804 may update the TLB entry and re-execute the instruction again. If POE 804 can reach (the lowest level) PTE and the present bit of the PTE is not set, and the POEable bit of the PTE is not set (meaning that this page cannot be pre-allocated), then POE 804 may trigger a page fault exception that is handled by the kernel. If POE 804 can reach a relevant (e.g., the lowest level) PTE corresponding to the TLB miss and the present parameter data field of the PTE is not set, and the POEable bit of the PTE is set, then POE 804 may store a TGID obtained from a PFN field of the PTE, obtain a page (e.g., by looking up a corresponding entry indicated by the tail index and checking that the valid bit of this entry is set) from pre-allocation table 814 of the current executing processor core, add a related page frame number into the PFN field of the PTE, and set some corresponding flags (for read: the present, accessed, and nx bits may set; for write: besides the three bits mentioned above, dirty bit and soft dirty bit may also be set) into the PTE. The user bit (e.g., bit 2) and RW bit (e.g., bit 1, if applicable) may already set by a pre-page fault kernel thread. (If the valid bit of a tail entry is not set, e.g., indicating that this entry does not contain valid page and that pre-allocation table 814 of this processor core is empty, then POE 804 may trigger a page fault exception that is handled by the kernel.) POE 804 may also update the TLB entry, write the faulting virtual memory address, store the TGID, set the used bit for the tail entry of pre-allocation table 814, cleans the valid bit of the tail entry, and increments the tail index by one.

MMU 808 may represent a computer hardware unit for receiving and/or handling memory references, e.g., read and write requests, from user applications, kernel 806, or other programs. MMU 808 may use TLB 810 to translate virtual memory addresses into physical memory addresses. For example, when a read or write request is received, MMU 808 may query, using a virtual memory address, TLB 810 to obtain a corresponding page frame number or other information for identifying a physical memory address (e.g., a of memory 816). In this example, after a physical memory address is identified, MMU 808 or another entity may perform the read or write request.

TLB 810 may represent an associative cache of PTE or relate data. For example, TLB 810 may utilize a content-addressable memory (CAM). In this example, when a physical memory address is needed for a virtual memory address, the CAM search key is the virtual memory address, and the search result is a physical memory address. If the requested physical memory address is present in the TLB, a TLB hit occurs and the retrieved physical memory address can be used to access memory. Otherwise, a TLB miss occurs and a page fault exception occurs.

In some embodiments, when a TLB miss or a related page fault exception occurs and requisite criteria is met, POE 804 may perform page fault handling and/or related operations. In such embodiments, where requisite criteria is not met, the page fault may be handled by a kernel based page fault exception handler.

Memory 816 may represent any suitable entity (e.g., non-transitory computer readable media, etc.) for storing code and data associated with kernel 806, user applications, or other programs. Memory 816 may represent a main or primary memory comprising random-access memory (RAM) or other storage media. In some embodiments, page table 812 containing PTEs and pre-allocation table 814 containing pre-allocated page information may be stored in memory.

Storage 818 may represent any suitable entity (e.g., non-transitory computer readable media, etc.) for storing code and data associated with kernel 806, user applications, or other programs. In some embodiments, memory 816 may represent a secondary memory comprising NVM, emerging NVM, PCM, NVDIMM, STT-RAM, and 3D XPoint or other storage media.

In some embodiments, storage 818 may be used as swap space storage for virtual memory and may not be directly addressable by CPU 802. For example, swapping may involve copying data content in memory 816 (e.g., RAM) to or from storage 818 (e.g., NVM). Continuing with this example, if the kernel or another entity attempts to access a virtual memory page stored in swap space, a page fault exception may occur (e.g., an error indicating that the page is not located in memory 816), and the page may be "swapped" from storage 818 to memory 816.

It will be appreciated that FIG. 8 is for illustrative purposes and that various nodes, their locations, and/or their functions may be changed, altered, added, or removed. For example, some nodes and/or functions may be combined into a single entity or some functionality (e.g., in POE 804) may be separated into separate nodes or modules. In another example, one or more entities depicted in FIG. 8 as implemented using CPU 802 may be implemented using different hardware and/or firmware.

FIG. 9 is a diagram illustrating an example process 900 for performing page fault handling and/or related operations. In some embodiments, process 900, or portions thereof (e.g., operations 902, 904, 906, 908, and 910) may be performed by or at CPU 802, POE 804, kernel 806, and/or another entity (e.g., node or module).

In some embodiments, operations 902-910 may be referred to as page fault handling operations and may be performed by or initiated by POE 804, while some other operations may be referred to as pre-page fault handling operations (e.g., operations generally occurring before operations 902-910 are completed), post-page fault handling operations (e.g., operations generally occurring after operations 902-910 are completed), and/or error handling operations (e.g., operations generally occurring in response to an error or to mitigate errors from occurring during page fault handling related operations).

In some embodiments, pre-page fault handling operations, post-fault handling operations and/or error handling operations may be performed asynchronously and/or independently of process 900 or operations thereof. In some embodiments, pre-page fault handling operations, post-fault handling operations and/or error handling operations performed by or initiated by one or more kernel associated threads or processes In some embodiments, one or more kernel related threads or processes may be triggered to facilitate process 900, portions thereof, or related operations. For example, kernel 806 may trigger or otherwise cause one or more background threads or processes to execute various page fault handling related operations asynchronously and/or independently of process 900. In this example, some operations that generally occur before operations 902-910 are completed for a given page fault may be referred to as pre-page fault handling operations, while operations that generally occur after operations 902-910 are completed for a given page fault may be referred to as post-page fault handling operations.

Referring to process 900, in operation 902, after a TLB miss associated with a virtual memory page occurs, a PTE associated with the virtual memory page may be identified in a page table. For example, POE 804 may be configured to walk page table 812 for identifying a relevant PTE associated with TLB miss.

In operation 904, it may be determined, using a first indicator in the PTE, that the virtual memory page may be not present in a main memory. For example, POE 804 or another entity may analyze a present parameter data field (e.g., a particular bit or set of bits) of a PTE to determine whether a corresponding virtual memory page is stored in a main memory (e.g., RAM).

In operation 906, it may be determined, using a second indicator in the PTE, that the virtual memory page is associated with a valid memory address and that the virtual memory page may be capable of using pre-allocated pages. For example, POE 804 or another entity may analyze a user bit or a parameter data field (e.g., a POEable bit or POEable parameter data field) of a PTE to determine whether a corresponding virtual memory page is associated with a valid memory address and that the virtual memory page is capable of using a pre-allocated page.

In operation 908, a page frame number associated with a pre-allocated page may be obtained from a pre-allocation table. For example, POE 804 or another entity may identify an available pre-allocated page from pre-allocation table 814 containing information about one or more available pre-allocated pages and may obtain a page frame number for indicating a physical memory address.

In operation 910, the PTE may be updated to indicate the page frame number. For example, POE 804 or another entity may modify a PTE to indicate a page frame number so that the page frame number is associated with a corresponding virtual memory page.

In some embodiments, after updating a PTE to indicate a page frame number associated with a pre-allocated page obtained from pre-allocation table 814, process 900 may also include update a corresponding TLB entry to indicate the page frame number. For example, POE 804 or another entity (e.g., a kernel associated background process or thread) may modify a TLB entry in a TLB so that a page frame number obtained via process 900 is associated with a corresponding virtual memory page.

In some embodiments, at least one kernel associated background process may perform one or more pre-page fault handling operations asynchronously (e.g., with process 900). For example, kernel 806 may trigger a background thread that is configured (e.g., programmed) to execute a pre-page fault handling operation, such as pre-allocating virtual memory pages and storing corresponding page frame numbers in pre-allocation table 814. In another example, a pre-page fault handling operation may include determining whether PTEs associated with a virtual memory region refer to valid memory addresses and setting valid memory address indications in the PTEs associated with the virtual memory region. In some embodiments, pre-page fault handling operations may be performed using a kernel associated delayed work queue.

In some embodiments, at least one kernel associated background process may perform one or more post-page fault handling operations periodically, wherein the one or more post-page fault handling operations may include updating one or more counters of pre-allocation table 814, adding one or more virtual memory pages to an LRU cache for swapping, or allocating one or more pre-allocated pages to replace used pre-allocated pages associated with pre-allocation table 814. In some embodiments, post-page fault handling operations may be performed using a kernel associated delayed work queue.

In some embodiments, at least one kernel associated background process may perform one or more error handling operations, wherein the one or more error handling operations may include scanning one or more pre-allocation tables 814 for entries associated with one or more applications and performing one or more post-page fault handling operations for each of the entries associated with the one or more applications. In some embodiments, error handling operations may be performed for reducing or mitigating issues associated with various scenarios, e.g., scenarios related to terminated applications, hung applications, or other applications where some page handling related operations were unable to complete or execute. In some embodiments, error handling operations may be performed using a kernel associated delayed work queue.

In some embodiments, a background thread (e.g., a kernel associated background process) may be statically scheduled at regular or irregular intervals to perform pre-allocation of pages. In some embodiments, a background thread may be dynamically triggered to run (e.g., execute) based on threshold values associated with a number of available pre-allocated pages. For example, a page pre-allocation background thread may run when the number of available pre-allocated pages drops below 10 or when the number of available pre-allocated pages is less than the number of pre-allocated pages recently used by the system, e.g., in the last three minutes. In some embodiments, a shared pool of pages may be made available to all cores in a processor. In some embodiments, a pool of pages may be made available to each processor or core separately.

While some aspects, techniques, and/or features of the subject matter described herein is motivated by the availability of the low latency NVM, it will be appreciated that various aspects, techniques, and/or features of the subject matter described herein can also be utilized in computing systems with higher latency SSDs and magnetic disks. Further, it will be appreciated that while various aspects and/or features of the subject matter described herein are described with reference to a single host or a single socket machine, these techniques can be used in and/or extended to shared memory machines and multi-socket machines as well as container based and/or virtual machine based virtualization computer systems.

It should be noted that POE 804 and/or functionality described herein may constitute a special purpose computing device or module (e.g., a hardware-implemented page walker, a hardware-implemented POE based exceptions handler, or a POE chip). Further, POE 804 and/or functionality described herein can improve the technological field of virtual memory management and/or page fault exceptions handling by providing mechanisms for performing page fault handling more efficiently and/or faster relative to various existing kernel based page fault exception handlers.

The disclosure of each of the following references is incorporated herein by reference in its entirety to the extent not inconsistent herewith and to the extent that it supplements, explains, provides a background for, or teaches methods, techniques, and/or systems employed herein.

REFERENCES

[1] B. C. Lee, P. Zhou, J. Yang, Y. Zhang, B. Zhao, E. Ipek, O. Mutlu, and D. Burger, "Phase-change technology and the future of main memory," *IEEE Micro*, vol. 30, pp. 131-141, March 2010.

[2] D. Narayanan and O. Hodson, "Whole-system persistence," in *ASPLOS XVII Proceedings of the seventeenth international conference on Architectural Support for Programming Languages and Operating Systems*, (London, England, UK), ACM, 2012.

[3] M. T. Krounbi, S. Watts, D. Apalkov, X. Tang, K. Moon, V. Nikitin, V. N. A. Ong, and E. Chen, "Status and challenges for non-volatile spin-transfer torque ram (stt-ram)," in *International Symposium on Advanced Gate Stack Technology '10*, (Albany, N.Y.), September 2010.

[4] "Intel optane technology." https://www.intel.com/content/www/us/en/architecture-and-technology/intel-optane-technology.html.

[5] L. Liang, R. Chen, H. Chen, Y. Xia, K. Park, B. Zang, and H. Guan, "A case for virtualizing persistent memory," in *SoCC '16 Proceedings of the Seventh ACM Symposium on Cloud Computing*, (Santa Clara, Calif., USA), ACM, 2016.

[6] Y. Zhang, J. Yang, A. Memaripour, and S. Swanson, "Mojim: A reliable and highly-available non-volatile memory system," in *ASPLOS '15 Proceedings of the Twentieth International Conference on Architectural Support for Programming Languages and Operating Systems*, (Istanbul, Turkey), ACM, 2015.

[7] Y. Kwon, H. Fingler, T. Hunt, S. Peter, E. Witchel, and T. Anderson, "Strata: A cross media file system," in *SOSP '17 Proceedings of the 26th Symposium on Operating Systems Principles*, (Shanghai, China), pp. 460-477, ACM, 2017.

[8] S. R. Dulloor, S. Kumar, A. Keshavamurthy, P. Lantz, D. Reddy, R. Sankaran, and J. Jackson, "System software for persistent memory," in *EuroSys '14 Proceedings of the Ninth European Conference on Computer Systems*, (Amsterdam, The Netherlands), ACM, 2014.

[9] J. Yang, Q. Wei, C. Chen, C. Wang, K. L. Yong, and B. He, "NV-Tree: Reducing consistency cost for NVM-based single level systems," in *FAST '15 Proceedings of the 13th USENIX Conference on File and Storage Technologies*, (Santa Clara, Calif., USA), USENIX, 2015.

[10] J. Xu and S. Swanson, "Nova: A log-structured file system for hybrid volatile/non-volatile main memories," in *FAST '16 Proceedings of the 14th USENIX Conference on File and Storage Technologies*, (Santa Clara, Calif., USA), pp. 323-338, USENIX, 2016.

[11] "Gen-Z specifications." https://genzconsortium.org/specifications/.

[12] K. Keeton, "Memory-driven computing," in *FAST '17*, (Santa Clara, Calif.), USENIX Association, 2017.

[13] X. Wu and A. L. N. Reddy, "Scmfs: A file system for storage class memory," in *SC '11 Proceedings of 2011*

International Conference for High Performance Computing, Networking, Storage and Analysis, (Seattle, Wash., USA), ACM, 2011.

[14] S. Qiu and A. L. N. Reddy, "Nvmfs: A hybrid file system for improving random write in NAND-flash SSD," in *MSST '13 IEEE 29th Symposium on Mass Storage Systems and Technologies*, (Long Beach, Calif., USA), IEEE, 2013.

[15] J. Condit, E. B. Nightingale, C. Frost, E. Ipek, B. Lee, D. Burger, and D. Coetzee, "Better i/o through byte-addressable, persistent memory," in *SOSP '09 Proceedings of the ACM SIGOPS 22nd symposium on Operating systems principles*, (Big Sky, Mont., USA), ACM, 2009.

[16] S. Venkataraman, N. Tolia, P. Ranganathan, and R. H. Campbell, "Consistent and durable data structures for non-volatile byte-addressable memory," in *FAST '11 Proceedings of the 9th USENIX Conference on File and Storage Technologies*, USENIX, 2011.

[17] SNIA, *NVM Programming Model*. Storage Networking Industry Association, 2017. Rev. 1.2.

[18] J. Coburn, A. M. Caulfield, A. Akel, L. M. Grupp, R. K. Gupta, R. Jhala, and S. Swanson, "NV-Heaps: Making persistent objects fast and safe with next-generation, non-volatile memories," in *ASPLOS XVI Proceedings of the sixteenth international conference on Architectural support for programming languages and operating systems*, (Newport Beach, Calif., USA), pp. 105-118, ACM, 2011.

[19] H. Volos, A. J. Tack, and M. M. Swift, "Mnemosyne: Lightweight persistent memory," in *ASPLOS XVI Proceedings of the sixteenth international conference on Architectural support for programming languages and operating systems*, (Newport Beach, Calif., USA), pp. 91-104, ACM, 2011.

[20] E. R. Giles, K. Doshi, and P. Varman, "Softwrap: A lightweight framework for transactional support of storage class memory," in *MSST '15 Proceedings of the 31st Symposium on Mass Storage Systems and Technologies*, (Santa Clara, Calif., USA), pp. 1-14, IEEE, 2015.

[21] A. Memaripour, A. Badam, A. Phanishayee, Y. Zhou, R. Alagappan, K. Strauss, and S. Swanson, "Atomic in-place updates for non-volatile main memories with kamino-tx," in *EuroSys '17 Proceedings of the Twelfth European Conference on Computer Systems*, (Belgrade, Serbia), pp. 499-512, ACM, 2017.

[22] K. Doshi, E. R. Giles, and P. Varman, "Atomic persistence for scm with a non-intrusive backend controller," in *HPCA '16 Proceedings of the IEEE International Symposium on High Performance Computer Architecture*, (Barcelona, Spain), IEEE, 2016.

[23] M. K. Qureshi, V. Srinivasan, and J. A. Rivers, "Scalable high performance main memory system using phase-change memory technology," in *ISCA '09 Proceedings of the 36th annual international symposium on Computer architecture*, (Austin, Tex., USA), ACM, 2009.

[24] P. Zhou, B. Zhao, J. Yang, and Y. Zhang, "A durable and energy efficient main memory using phase change memory technology," in *ISCA '09 Proceedings of the 36th annual international symposium on Computer architecture*, (Austin, Tex., USA), ACM, 2009.

[25] J. Zhao, S. Li, D. H. Yoon, Y. Xie, and N. P. Jouppi, "Kiln: Closing the performance gap between systems with and without persistence support," in *MICRO '13 Proceedings of the 46th Annual IEEE/ACM International Symposium on Microarchitecture*, (Davis, Calif., USA), IEEE, 2013.

[26] A. Joshi, V. Nagarajan, S. Viglas, and M. Cintra, "Atom: Atomic durability in non-volatile memory through hardware logging," in *HPCA '17 Proceedings of the IEEE International Symposium on High Performance Computer Architecture*, (Austin, Tex., USA), IEEE, 2017.

[27] J. Jung, Y. Won, E. Kim, H. Shin, and B. Jeon, "Frash: Exploiting storage class memory in hybrid file system for hierarchical storage," *ACM Transactions on Storage (TOS)*, vol. 6, no. 1, 2010.

[28] H. Volos, S. Nalli, S. Panneerselvam, V. Varadarajan, P. Saxena, and M. M. Swift, "Aerie: Flexible file-system interfaces to storage-class memory," in *EuroSys '14 Proceedings of the Ninth European Conference on Computer Systems*, (Amsterdam, The Netherlands), ACM, 2014.

[29] V. Fedorov, J. Kim, M. Qin, P. V. Gratz, and A. L. N. Reddy, "Speculative paging for future NVM storage," in *MEMSYS '17 Proceedings of the International Symposium on Memory Systems*, (Alexandria, Va.), 2017.

[30] D. Watts, "Intel optane dc persistent memory product guide," 2019. https://lenovopress.com/lp1066-intel-optane-dc-persistent-memory.

[31] "Intel persistent memory development kit." https://pmem.io/pmdk/.

[32] Intel, "Storage performance development kit," 2017. https://spdk.io/.

[33] Samsung, "Ultra-low latency with samsung z-nand ssd," 2017. https://www.samsung.com/semiconductor/global.semi.static/Ultra-Low_Latency_with_Samsung_Z-NAND_SSD-0.pdf.

[34] L. A. Eisner, T. Mollov, and S. Swanson, "Quill: Exploiting fast non-volatile memory by transparently bypassing the file system," UCSD CSE Tech. Rep. CS2013-0991, University of California, San Diego, San Diego, Calif., 2013.

[35] M. Swift, "Persistent memory ordering," 2015. http://materials.dagstuhl.de/files/15/15021/15021.MichaelSwift1.Slides.pdf.

[36] H. Wan, Y. Lu, Y. Xu, and J. Shu, "Empirical study of redo and undo logging in persistent memory," in *NVMSA '16 Proceeding of the 5th Non-Volatile Memory Systems and Applications Symposium*, (Daegu, South Korea), pp. 1-6, IEEE, 2016.

[37] A. Chen, "A review of emerging non-volatile memory (NVM) technologies and applications," *Solid-State Electronics*, vol. 125, pp. 25-38, 2016.

[38] S. Yu and P.-Y. Chen, "Emerging memory technologies: Recent trends and prospects," *IEEE Solid-State Circuits Magazine*, vol. 8, no. 2, pp. 43-56, 2016.

[39] Y. Zhang and S. Swanson, "A study of application performance with non-volatile main memory," in *MSST '15 Proceedings of the 31st Symposium on Mass Storage Systems and Technologies*, (Santa Clara, Calif.), IEEE, 2015.

[40] B. F. Cooper, A. Silberstein, ErwinTam, R. Ramakrishnan, and R. Sears, "Benchmarking cloud serving systems with YCSB," in *SoCC '10 Proceedings of the 1st ACM symposium on Cloud computing*, (Indianapolis, Ind., USA), pp. 143-154, ACM, 2010.

[41] "Transaction isolation levels." https://docs.microsoft.com/en-us/sql/odbc/reference/develop-app/transaction-isolation-levels?view=sql-server-2017.

[42] S. Pelley, P. M. Chen, and T. F. Wenisch, "Memory persistency," in *ISCA '14 Proceeding of the 41st annual international symposium on Computer architecuture*, (Minneapolis, Minn., USA), pp. 265-276, ACM, 2014.

[43] C. Wang, Q. Wei, J. Yang, C. Chen, and M. Xue, "How to be consistent with persistent memory? an evaluation approach," in *NAS '15*, (Boston, Mass.), pp. 186-194, IEEE, August 2015.
[44] S. Swanson, "A vision of persistence." https://www.sigarch.org/a-vision-of-persistence/.
[45] "Mongodb." https://github.com/mongodb.
[46] "Mmapv1 storage engine." https://docs.mongodb.com/manual/processorcore/mmapv1/.
[47] "Docker container." https://www.docker.com/.
[48] "Docker container bind mounts." https://docs.docker.com/storage/bind-mounts//.
[49] S. Borkar, "Designing reliable systems from unreliable components: The challenges of transistor variability and degradation," *IEEE Micro*, vol. 25, pp. 10-16, 2005.
[50] B. Schroeder, E. Pinheiro, and W.-D. Weber, "Dram errors in the wild: A large-scale field study," in *SIGMETRICS '09*, (Seattle, Wash.), pp. 193-204, ACM, June 2009.
[51] K. Ye, D. Huang, X. Jiang, H. Chen, and S. Wu, "Virtual machine based energy-efficient data center architecture for cloud computing: A performance perspective," in *GREENCOMCPSCOM '10*, pp. 171-178, IEEE, December 2010.
[52] K. Chanchio and X.-H. Sun, "Communication state transfer for the mobility of concurrent heterogeneous computing," *IEEE Transactions on Computers*, vol. 53, pp. 1260-1273, 2004.
[53] S. Gao, B. He, and J. Xu, "Real-time in-memory checkpointing for future hybrid memory systems," in *ICS '15*, (Newport Beach, Calif.), pp. 263-272, ACM, June 2015.
[54] S. Kannan, A. Gavrilovska, K. Schwan, and D. Milojicic, "Optimizing checkpoints using nvm as virtual memory," in *IPDPS '13*, (Boston, Mass.), IEEE, May 2013.
[55] X. Dong, N. Muralimanohar, N. Jouppi, R. Kaufmann, and Y. Xie, "Leveraging 3d pcram technologies to reduce checkpoint overhead for future exascale systems," in *SC '09*, (Portland, Oreg.), ACM, November 2009.
[56] J. Xie, X. Dong, and Y. Xie, "3d memory stacking for fast checkpointing/restore applications," in *3DIC '10*, (Munich, Germany), IEEE, November 2010.
[57] X. Dong, Y. Xie, N. Muralimanohar, and N. P. Jouppi, "Hybrid checkpointing using emerging nonvolatile memories for future exascale systems," *ACM TACO*, vol. 8, July 2011.
[58] Intel, "Intel store intrinsics."https://software.intel.com/en-us/node/524244.
[59] C. Clark, K. Fraser, S. Hand, J. G. Hansen, E. Jul, C. Limpach, I. Pratt, and A. Warfield, "Live migration of virtual machines," in *NSDI '05*, (Berkeley, Calif.), pp. 273-286, USENIX, May 2005.
[60] E. R. Zayas, "Attacking the process migration bottleneck," in *SOSP '87*, (Austin, Tex.), pp. 13-24, ACM, November 1987.
[61] M. R. Hines, U. Deshpande, and K. Gopalan, "Postcopy live migration of virtual machines," *ACM SIGOPS Operating Systems Review*, vol. 43, pp. 14-26, July 2009.
[62] S. Sahni and V. Varma, "A hybrid approach to live migration of virtual machines," in *CCEM '12*, (Bangalore, India), IEEE, October 2012.
[63] K. Ye, X. Jiang, D. Huang, J. Chen, and B. Wang, "Live migration of multiple virtual machines with resource reservation in cloud computing environments," in *CLOUD '11*, (Washington, D.C.), IEEE, July 2011.
[64] M. F. Bari, M. F. Zhani, Q. Zhang, R. Ahmed, and R. Boutaba, "CQNCR: Optimal VM migration planning in cloud data centers," in *IFIP '14*, (Trondheim, Norway), IEEE, June 2014.
[65] J. Li, C. Pu, Y. Chen, V. Talwar, and D. Milojicic, "Improving preemptive scheduling with application-transparent checkpointing in shared clusters," in *Middleware '15*, (Vancouver, BC, Canada), pp. 222-234, ACM, December 2015.
[66] B. Cho, M. Rahman, T. Chajed, I. Gupta, C. Abad, N. Roberts, and P. Lin, "Natjam: Design and evaluation of eviction policies for supporting priorities and deadlines in mapreduce clusters," in *SoCC '13*, (Santa Clara, Calif.), ACM, October 2013.
[67] Y. Shao, W. Bao, X. Zhu, W. Xiao, and J. Wang, "Chord: Checkpoint-based scheduling using hybrid waiting list in shared clusters," *Journal of Systems and Software*, vol. 131, pp. 22-34, September 2017.
[68] S. Kashyap, C. Min, B. Lee, T. Kim, and P. Emelyanov, "Instant os updates via userspace checkpoint-and-restart," in *ATC '16*, (Denver, Colo.), pp. 605-619, USENIX, June 2016.
[69] P. Fernando, S. Kannan, A. Gavrilovska, and K. Schwan, "Phoenix: Memory speed hpc i/o with nvm," in *HiPC '16*, (Hyderabad, India), IEEE, December 2016.
[70] "Checkpoint/Restore In Userspace (CRIU)." https://www.criu.org/.
[71] "GDB: the GNU Project debugger." https://www.gnu.org/s/gdb/.
[72] "Linux pipe." http://man7.org/linux/man-pages/man2/pipe.2.html.
[73] "Linux userfaultfd." http://man7.org/linux/man-pages/man2/userfaultfd.2.html.
[74] C. Jo, E. Gustafsson, J. Son, and B. Egger, "Efficient live migration of virtual machines using shared storage," in *VEE '13*, (Houston, Tex.), pp. 41-50, ACM, March 2013.
[75] "Direct access for files." https://www.kernel.org/doc/Documentation/filesystems/dax.txt.
[76] "Linux write." http://man7.org/linux/man-pages/man2/write.2.html.
[77] "Emulated nvdimm in linux." https://nvdimm.wiki.kernel.org/.
[78] D. Baliley, E. Barszcz, J. Barton, D. Browning, R. Carter, L. Dagum, R. Fatoohi, P. Frederickson, T. Lasinski, R. Schreiber, H. Simon, V. Venkatakrishnan, and S. Weeratunga, "The NAS parallel benchmarks-summary and preliminary results," in *SC '91*, pp. 158-165, ACM, 1991.
[79] C. Bienia, S. Kumar, J. P. Singh, and K. Li, "The PARSEC benchmark suite: characterization and architectural implications," in *PACT '08*, (Toronto, Ontario, Canada), pp. 72-81, ACM, October 2008.
[80] S. C. Woo, M. Ohara, E. Torrie, J. P. Singh, and A. Gupta, "The SPLASH-2 programs: Characterization and methodological considerations," in *ISCA '95*, (S. Margherita Ligure, Italy), pp. 24-36, ACM, June 1995.
[81] "Redis: An in-memory data structure store." http://redis.io/.
[82] "Gen-z overview." https://genzconsortium.org/wp-content/uploads/2018/05/Gen-Z-Overview.pdf.
[83] "Phase change memory." http://www.pdl.cmu.edu/SDI/2009/slides/Numonyx.pdf.
[84] "iperf the ultimate speed test tool for tcp, udp and sctp." https://iperf.fr/iperf-download.php.
[85] R. Peglar, "The future of storage systems—a dangerous opportunity," in *MSST '19 Proceedings of the 35st Sym-* posium on Mass Storage Systems and Technologies, (Santa Clara, Calif.), IEEE, 2019.

[86] C. C. Chou, J. Jung, A. L. N. Reddy, P. V. Gratz, and D. Voigt, "vnvml: An efficient user space library for virtualizing and sharing non-volatile memories," in *MSST '19 Proceedings of the 35st Symposium on Mass Storage Systems and Technologies,* (Santa Clara, Calif.), IEEE, 2019.

[87] H. Alam, T. Zhang, M. Erez, and Y. Etsion, "Do-it-yourself virtual memory translation," in *ISCA '17,* (Toronto, ON, Canada), ACM, June 2017.

[88] R. Bhargava, B. Serebrin, F. Spadini, and S. Manne, "Accelerating two-dimensional page walks for virtualized systems," in *International conference on Architectural support for programming languages and operating systems '13,* 2008.

[89] "Lockless ring buffer design." https://www.kernel.org/doc/Documentation/trace/ring-buffer-design.txt.

[90] N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 simulator," *ACM SIGARCH Computer Architecture News,* vol. 39, pp. 1-7, May 2011.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method for performing page fault handling, the method comprising:
  performing page fault handling operations, the page fault handling operations comprising:
    after a translation lookaside buffer (TLB) miss associated with a virtual memory page occurs, identifying, in a page table, a page table entry (PTE) associated with the virtual memory page;
    determining, using a first indicator in the PTE, that the virtual memory page is not present in a main memory;
    determining, using a second indicator in the PTE, that the virtual memory page is associated with a valid memory address and that the virtual memory page is capable of using pre-allocated pages;
    obtaining, from a pre-allocation table, a page frame number associated with a pre-allocated page; and
    updating the PTE to indicate the page frame number.

2. The method of claim 1, wherein at least one kernel associated background process performs one or more pre-page fault handling operations asynchronously.

3. The method of claim 2, wherein one of the pre-page fault handling operations comprises:
  pre-allocating virtual memory pages and storing corresponding page frame numbers in the pre-allocation table.

4. The method of claim 2, wherein one of the pre-page fault handling operations comprises:
  determining whether PTEs associated with a virtual memory region refer to valid memory addresses and for setting valid memory address indications in the PTEs associated with the virtual memory region.

5. The method of claim 1, wherein the second indicator is a valid memory address indicator and is stored in a user bit or a parameter data field of the PTE.

6. The method of claim 1, wherein the first indicator is stored in a present bit or a present parameter data field of the PTE.

7. The method of claim 1, wherein at least one kernel associated background process performs one or more post-page fault handling operations periodically, wherein the one or more post-page fault handling operations includes updating one or more counters of the pre-allocation table, adding one or more virtual memory pages to a last recently used (LRU) cache for swapping, or allocating one or more pre-allocated pages to replace used pre-allocated pages associated with the pre-allocation table.

8. The method of claim 1, wherein at least one kernel associated background process performs one or more operations of pre-allocating pages dynamically based on at least one threshold value or trigger associated with a number of available pre-allocated pages.

9. The method of claim 1, wherein the page fault handling operations are performed without a context switch from user space to kernel space.

10. The method of claim 1, wherein the page fault handling operations, pre-page fault handling operations, and/or post-page fault handling operations are performed using a kernel associated delayed work queue.

11. The method of claim 1, wherein at least one kernel associated background process performs one or more error handling operations, wherein the one or more error handling operations includes scanning one or more pre-allocation tables for entries associated with one or more applications and performing one or more post-page fault handling operations for each of the entries associated with the one or more applications.

12. A system for performing page fault handling, the system comprising:
  at least one processor; and
  a page fault handling offload engine (POE) implemented using the at least one processor, wherein the POE is configured for performing page fault handling operations, the page fault handling operations comprising:
    after a translation lookaside buffer (TLB) miss associated with a virtual memory page occurs, identifying, in a page table, a page table entry (PTE) associated with the virtual memory page;
    determining, using a first indicator in the PTE, that the virtual memory page is not present in a main memory;
    determining, using a second indicator in the PTE, that the virtual memory page is associated with a valid memory address and that the virtual memory page is capable of using pre-allocated pages;

obtaining, from a pre-allocation table, a page frame number associated with a pre-allocated page; and updating the PTE to indicate the page frame number.

13. The system of claim 12, wherein at least one kernel associated background process performs one or more pre-page fault handling operations asynchronously.

14. The system of claim 13, wherein one of the pre-page fault handling operations comprises:

pre-allocating virtual memory pages and storing corresponding page frame numbers in the pre-allocation table.

15. The system of claim 13, wherein one of the pre-page fault handling operations comprises:

determining whether PTEs associated with a virtual memory region refer to valid memory addresses and for setting valid memory address indicators in the PTEs associated with the virtual memory region.

16. The system of claim 12, wherein the second indicator is a valid memory address indicator and is stored in a user bit or a parameter data field of the PTE.

17. The system of claim 12, wherein at least one kernel associated background process performs one or more post-page fault handling operations periodically, wherein the one or more post-page fault handling operations includes updating one or more counters of the pre-allocation table, adding one or more virtual memory pages to a last recently used (LRU) cache for swapping, or allocating one or more pre-allocated pages to replace used pre-allocated pages associated with the pre-allocation table.

18. The system of claim 12, wherein the page fault handling operations, pre-page fault handling operations, and/or post-page fault handling operations are performed using a kernel associated delayed work queue.

19. The system of claim 12, wherein at least one kernel associated background process performs one or more error handling operations, wherein the one or more error handling operations includes scanning one or more pre-allocation tables for entries associated with one or more applications and performing one or more post-page fault handling operations for each of the entries associated with the one or more applications.

20. A non-transitory computer readable medium having stored thereon executable instructions that when executed by a processor of a computer cause the computer to perform page fault handling operations comprising:

after a translation lookaside buffer (TLB) miss associated with a virtual memory page occurs, identifying, in a page table, a page table entry (PTE) associated with the virtual memory page;

determining, using a first indicator in the PTE, that the virtual memory page is not present in a main memory;

determining, using a second indicator in the PTE, that the virtual memory page is associated with a valid memory address and that the virtual memory page is capable of using pre-allocated pages;

obtaining, from a pre-allocation table, a page frame number associated with a pre-allocated page; and updating the PTE to indicate the page frame number.

* * * * *